(12) United States Patent
Seo et al.

(10) Patent No.: US 9,548,843 B2
(45) Date of Patent: Jan. 17, 2017

(54) METHOD FOR PERFORMING COMMUNICATION BETWEEN TERMINALS AND APPARATUS THEREFOR

(71) Applicant: LG ELECTRONICS INC., Seoul (KR)

(72) Inventors: Hanbyul Seo, Seoul (KR); Hakseong Kim, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/761,580

(22) PCT Filed: Jan. 16, 2014

(86) PCT No.: PCT/KR2014/000467
§ 371 (c)(1),
(2) Date: Jul. 16, 2015

(87) PCT Pub. No.: WO2014/112802
PCT Pub. Date: Jul. 24, 2014

(65) Prior Publication Data
US 2015/0341150 A1 Nov. 26, 2015

Related U.S. Application Data

(60) Provisional application No. 61/753,417, filed on Jan. 16, 2013, provisional application No. 61/765,019, (Continued)

(51) Int. Cl.
*H04W 4/00* (2009.01)
*H04L 5/00* (2006.01)
(Continued)

(52) U.S. Cl.
CPC ........... *H04L 5/0042* (2013.01); *H04B 7/2656* (2013.01); *H04W 56/0045* (2013.01); *H04W 72/048* (2013.01); *H04W 72/0446* (2013.01)

(58) Field of Classification Search
CPC ............... H04L 5/0042; H04W 72/048; H04W 56/0045; H04W 72/0446; H04B 7/2656
See application file for complete search history.

(56) References Cited

U.S. PATENT DOCUMENTS 8,811,359 B2 * 8/2014 Wang ................ H04W 72/0493
370/338
9,185,690 B2 * 11/2015 Khoshnevis ........ H04W 72/042
(Continued)

FOREIGN PATENT DOCUMENTS

JP 2000-286775 A 10/2000
JP 2012-244422 A 12/2012
(Continued)

*Primary Examiner* — Clemence Han
(74) *Attorney, Agent, or Firm* — Birch, Stewart, Kolasch & Birch, LLP

(57) ABSTRACT

Disclosed is a method for enabling a first terminal to communicate with a second terminal. Specifically, the method includes the steps of: receiving from a base station the format information of a first sub-frame for directly communicating with a second terminal; and assigning a signal for direct communication between the terminals to the first sub-frame according to the format information, wherein the format information contains the information concerning the resource region assigned with the signal for the direct communication between the terminals in the first sub-frame if a part of the first sub-frame overlaps a subsequent second sub-frame.

20 Claims, 29 Drawing Sheets

Related U.S. Application Data filed on Feb. 14, 2013, provisional application No. 61/843,061, filed on Jul. 5, 2013, provisional application No. 61/876,211, filed on Sep. 10, 2013.

(51) Int. Cl.
*H04W 72/04* (2009.01)
*H04B 7/26* (2006.01)
*H04W 56/00* (2009.01)

(56) References Cited

U.S. PATENT DOCUMENTS

| | | |
|---|---|---|
| 2011/0255450 A1 | 10/2011 | Wang et al. |
| 2012/0099543 A1 | 4/2012 | Yang et al. |
| 2012/0142268 A1 | 6/2012 | Tao et al. |
| 2012/0165058 A1 | 6/2012 | Hwang et al. |
| 2012/0243431 A1 | 9/2012 | Chen et al. |
| 2012/0269178 A1 | 10/2012 | Li et al. |
| 2013/0142268 A1* | 6/2013 | Gao .................. H04W 72/04 375/252 |
| 2013/0195026 A1* | 8/2013 | Johnsson ............ H04W 72/085 370/329 |
| 2013/0273923 A1* | 10/2013 | Li .................... H04W 28/02 455/450 |
| 2014/0003262 A1* | 1/2014 | He .................... H04W 28/08 370/252 |
| 2014/0036890 A1 | 2/2014 | Iwamura et al. |
| 2014/0098784 A1 | 4/2014 | Iwamura et al. |
| 2014/0148177 A1* | 5/2014 | Ratasuk .............. H04W 72/02 455/450 |
| 2014/0185530 A1* | 7/2014 | Kuchibhotla ....... H04W 76/023 370/329 |
| 2015/0146647 A1* | 5/2015 | Chatterjee ............ H04L 5/0032 370/329 |
| 2015/0163037 A1* | 6/2015 | Seo .................... H04W 76/023 370/336 |
| 2015/0181546 A1* | 6/2015 | Freda ................ H04W 56/0015 370/336 |
| 2015/0257184 A1* | 9/2015 | Yamazaki ............ H04W 72/04 370/329 |

FOREIGN PATENT DOCUMENTS

| | | |
|---|---|---|
| JP | 2012-244424 A | 12/2012 |
| WO | WO 2010/108549 A1 | 9/2010 |
| WO | WO 2012/019348 A1 | 2/2012 |

\* cited by examiner

FIG. 6
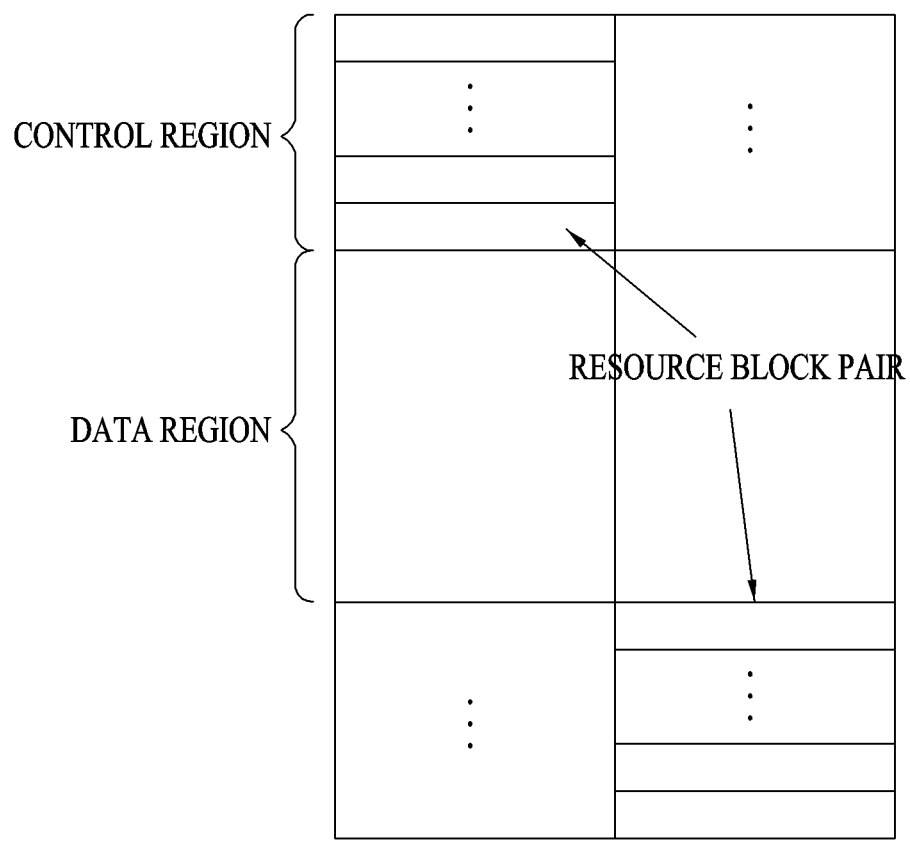
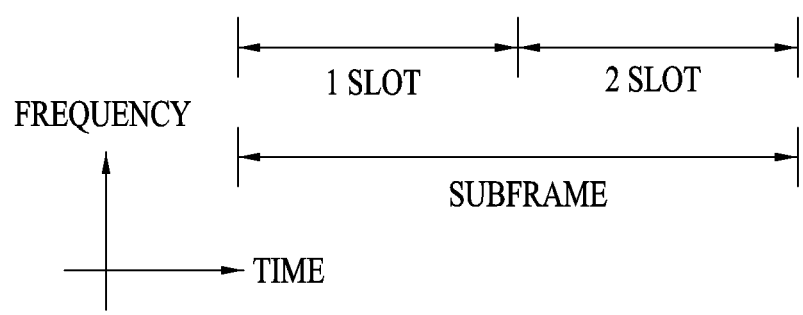

FIG. 7
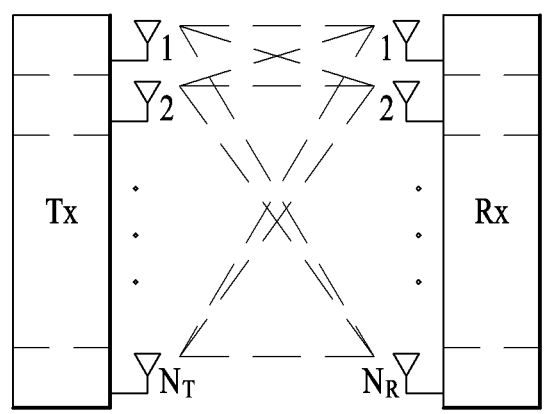
(a)
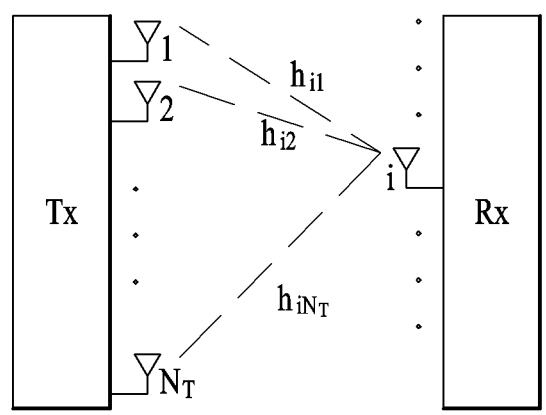
(b)

FIG. 9
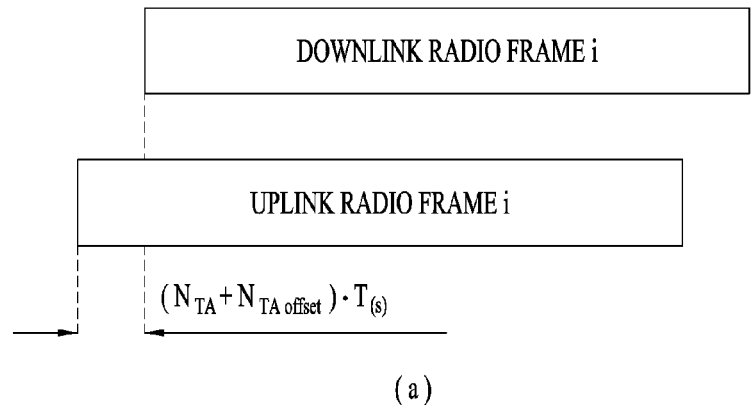
(a)
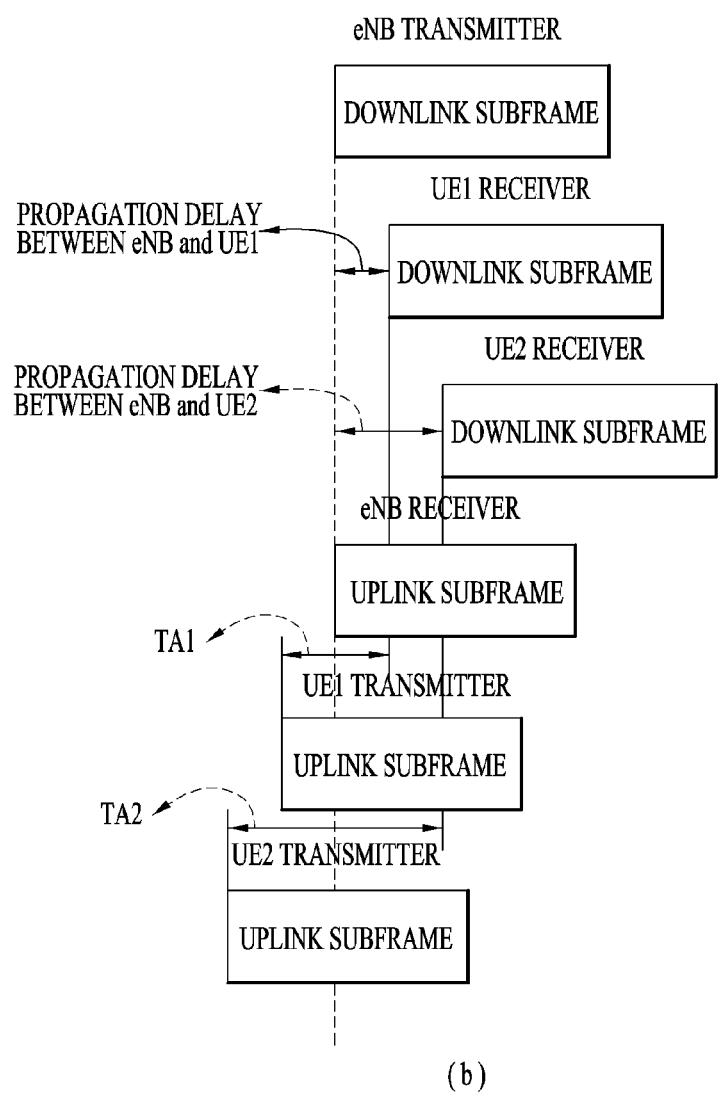
(b)

(a)

(b)

(d)

FIG. 17
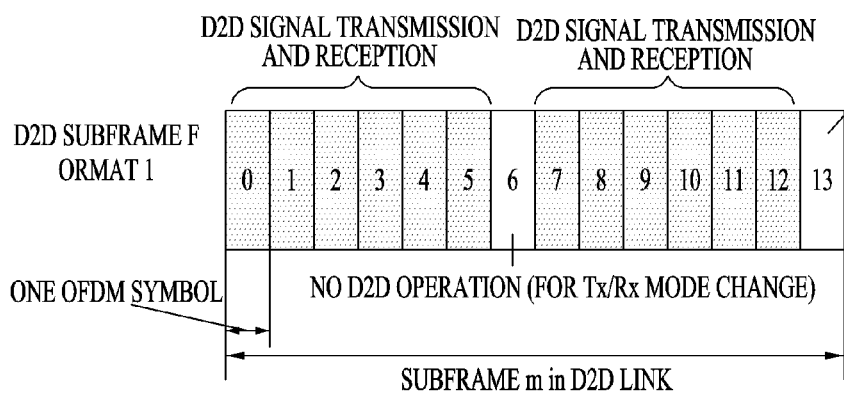
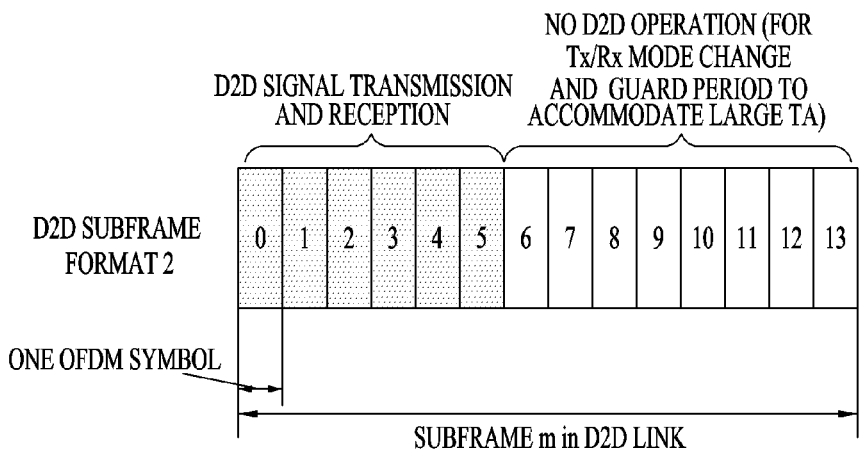

METHOD FOR PERFORMING COMMUNICATION BETWEEN TERMINALS AND APPARATUS THEREFOR

CROSS REFERENCE TO RELATED APPLICATIONS

This application is the National Phase of PCT International Application No. PCT/KR2014/000467, filed on Jan. 16, 2014, which claims priority under 35 U.S.C. 119(e) to U.S. Provisional Application No. 61/753,417 filed on Jan. 16, 2013, 61/765,019 filed on Feb. 14, 2013, 61/843,061 filed on Jul. 5, 2013, and 61/876,211 filed on Sep. 10, 2013, all of which are hereby expressly incorporated by reference into the present application.

TECHNICAL FIELD

The present invention relates to a wireless communication system and, more particularly, to a method for performing device-to-device (D2D) communication in a wireless communication system and an apparatus therefor.

BACKGROUND ART

A 3rd generation partnership project long term evolution (3GPP LTE) (hereinafter, referred to as "LTE") communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a method for performing device-to-device (D2D) communication in a wireless communication system and an apparatus therefor.

Technical Solution

The object of the present invention can be achieved by providing a method for, at a first user equipment (UE), performing communication with a second UE and a base station in a wireless communication system including receiving format information of a first subframe for device-to-device (D2D) communication with the second UE from the base station, and assigning a signal for D2D communication to the first subframe according to the format information, wherein the format information includes information on a resource region, to which the signal for D2D communication is assigned, in the first subframe, when a part of the first subframe overlaps a subsequent second subframe.

The first subframe may include a first region overlapping the second subframe and a second region which is the remaining region, and the signal for D2D communication may be assigned to only the first region.

A part of the first region may be set as a guard period for transmission and reception switching.

When the length of the second region is less than or equal to that of one slot, the signal for D2D communication may be assigned to only a first slot of the first subframe.

The format information may be determined based on a maximum value of timing advance (TA) values of UEs accessing the same network.

The format information may be transmitted via at least one of system information and radio resource connection (RRC) signaling.

In another aspect of the present invention, provided herein is a user equipment (UE) apparatus in a wireless communication system including a transceiver module configured to receive format information of a first subframe for device-to-device (D2D) communication with a second UE from a base station, and a processor configured to assign a signal for D2D communication to the first subframe according to the format information, wherein the format information includes information on a resource region, to which the signal for D2D communication is assigned, in the first subframe, when a part of the first subframe overlaps a subsequent second subframe.

Advantageous Effects

According to the present invention, it is possible to efficiently configure resources in consideration of a communication relationship with an eNB when performing device-to-device (D2D) communication.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 6 is a diagram showing the structure of an uplink subframe.

FIG. 7 is a diagram showing the configuration of a multiple input multiple output (MIMO) wireless communication system.

FIG. 9 is a diagram illustrating a method of detecting a boundary of an uplink subframe.

FIG. 17 is a diagram showing the format of a D2D transmission and reception signal according to an embodiment of the present invention.

BEST MODE

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

The structure of a radio frame in 3GPP LTE system will be described with reference to FIGS. 2 and 3.

Figure 1:
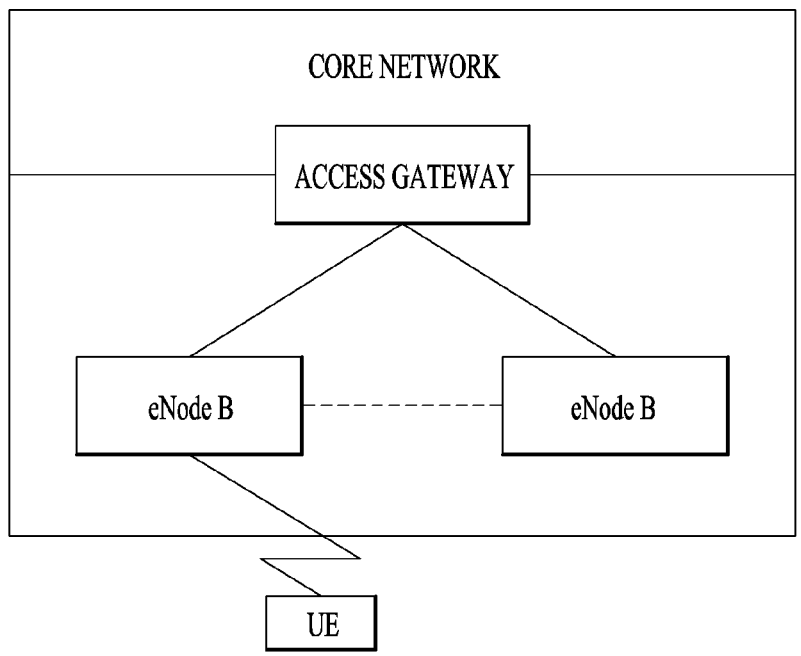
FIG. 1 is a diagram showing the structure of a wireless system applied to the present invention.
Figure 2:
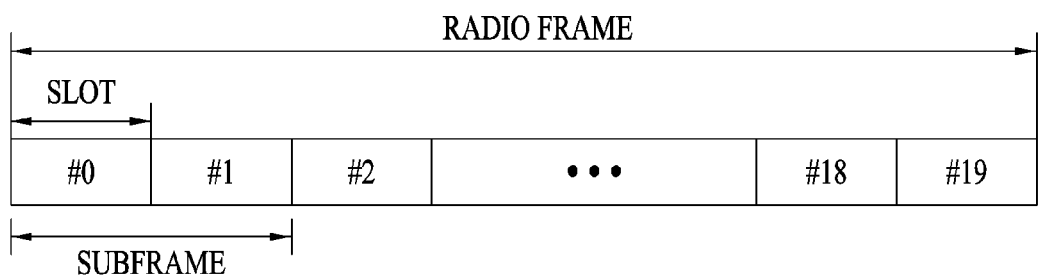
FIG. 2 is a diagram illustrating a radio frame in a long term evolution (LTE) frequency division duplex (FDD) system.

FIG. 2 is a diagram showing the structure of the radio frame of LTE FDD (FREQUENCY DIVISION DUPLEX) system.

A radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

Figure 3:
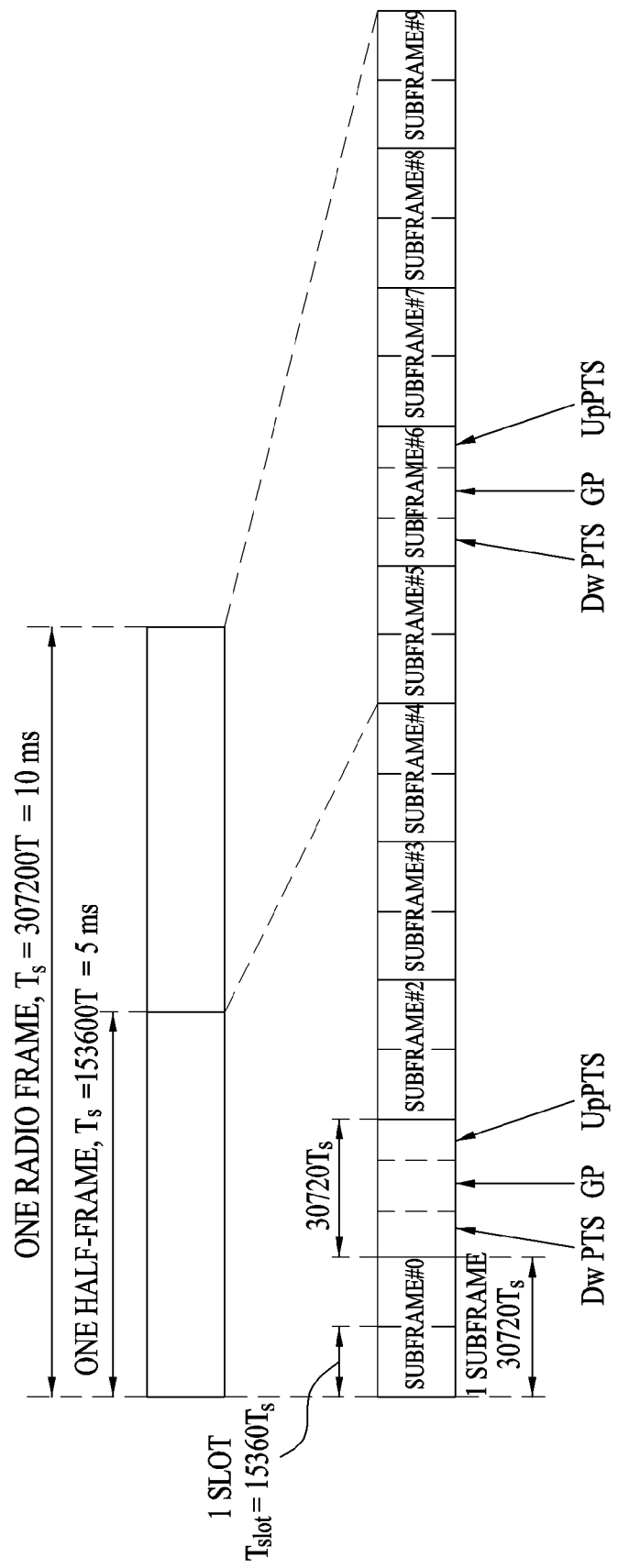
FIG. 3 is a diagram illustrating a radio frame in a long term evolution (LTE) time division duplex (TDD) system.

FIG. 3 is a diagram showing the structure of the radio frame of LTE TDD (Time Division Duplex) system.

FIG. 3 describes the structure of the radio frame of LTE TDD system. The radio frame of LTE TDD system includes two half frames, each of which includes 4 subframes, each subframe includes 2 slots, and special subframe including a downlink pilot time slot (DwPTS), a guard period (GP), and an uplink pilot time slot (UpPTS).

In the special subframe, the DwPTS is used for initial cell search, synchronization and channel estimation at a user equipment. The UpPTS is used for channel estimation and uplink transmission synchronization of the user equipment. That is, the DwPTS is used for downlink transmission, the UpPTS is used for uplink transmission. Particularly, the UpPTS is used to PRACH preamble or SRS transmission. The guard period is to remove interference occurring in an uplink due to multi-path delay of a downlink signal between the uplink and a downlink.

Meanwhile, in the LTE TDD system is as following table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D denotes a downlink subframe, U denotes an uplink subframe, and S denotes a special subframe. Also, Table 1 also illustrates downlink-uplink switching periodicity in the uplink/downlink configuration of each system. The supported uplink/downlink subframe is listed in Table 1. For each subframe of a radio frame, "D" denotes a subframe reserved for downlink transmission, "U" denotes a subframe reserved for uplink transmission, "S" denotes a special subframe composed of a downlink pilot time slot (DwPTS), a guard period (GP) and an uplink pilot time slot (UpPTS).

The configuration of the special subframe is defined in the current 3GPP standard document as shown in Table 2 below. Table 2 illustrates the DwPTS and the UpPTS in case of $T_S=1(15000*2048)$, and the other region is configured as the guard period.

TABLE 2

| | Normal cyclic prefix in downlink | | | Extended cyclic prefix in downlink | | |
|---|---|---|---|---|---|---|
| | | UpTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |

TABLE 2-continued

| | Normal cyclic prefix in downlink | | | Extended cyclic prefix in downlink | | |
| | | UpTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 5 | 6592·$T_S$ | 4384·$T_S$ | 5120·$T_S$ | 20480·$T_S$ | | |
| 6 | 19760·$T_S$ | | | 23040·$T_S$ | | |
| 7 | 21952·$T_S$ | | | 12800·$T_S$ | | |
| 8 | 24144·$T_S$ | | | — | — | — |
| 9 | 13168·$T_S$ | | | — | — | — |

The radio frame of LTE TDD system described above includes two half frames, each of which includes 4 subframes, each subframe includes 2 slots, and special subframe including a downlink pilot time slot (DwPTS), a guard period (GP), and an uplink pilot time slot (UpPTS).

Figure 4:
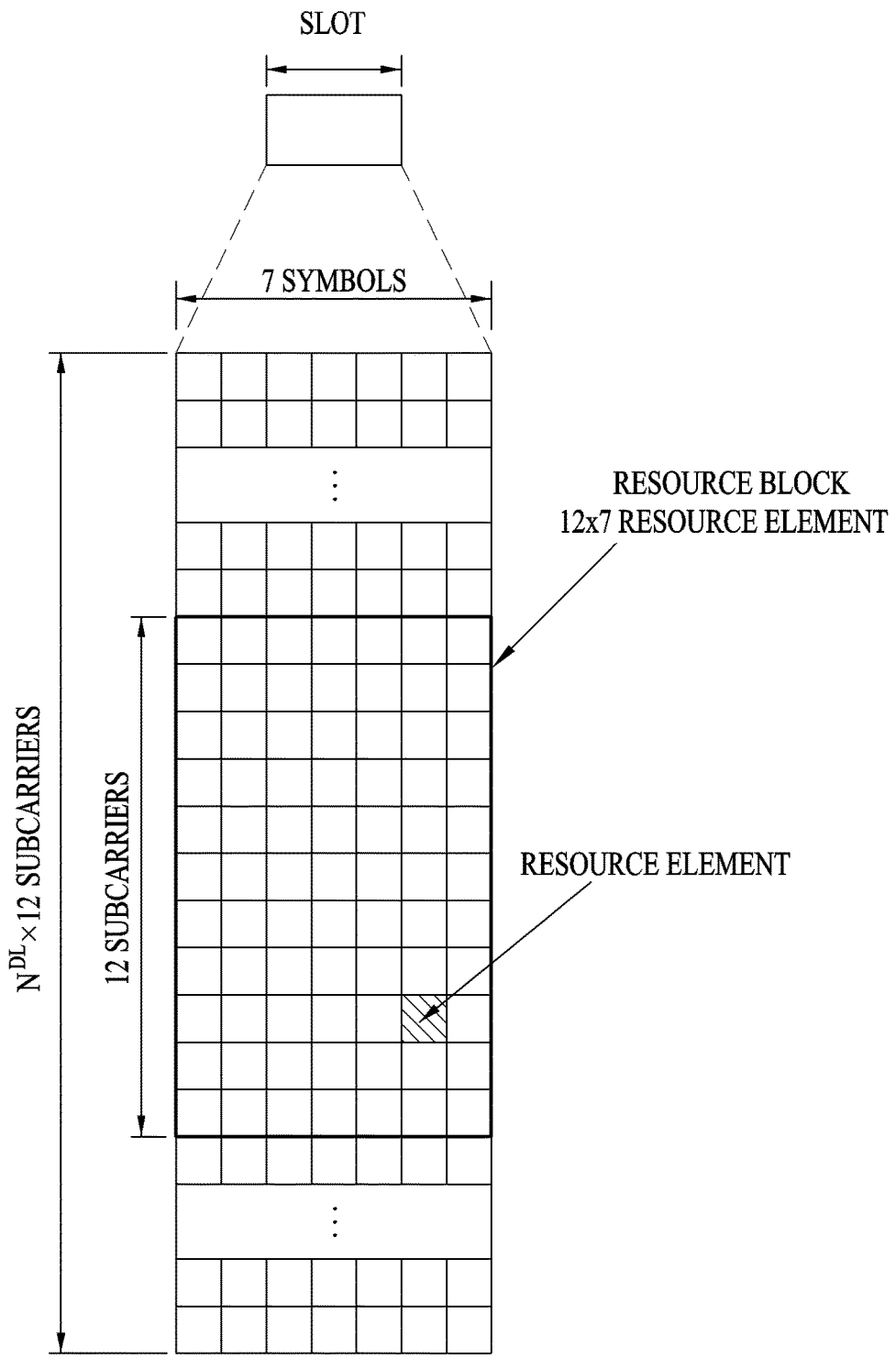
FIG. 4 is a diagram showing a resource grid in a downlink slot.

FIG. 4 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number NDL of RBs included in the downlink slot is determined based on a downlink transmission bandwidth. The structure of the uplink slot may be equal to the structure of the downlink slot.

Figure 5:
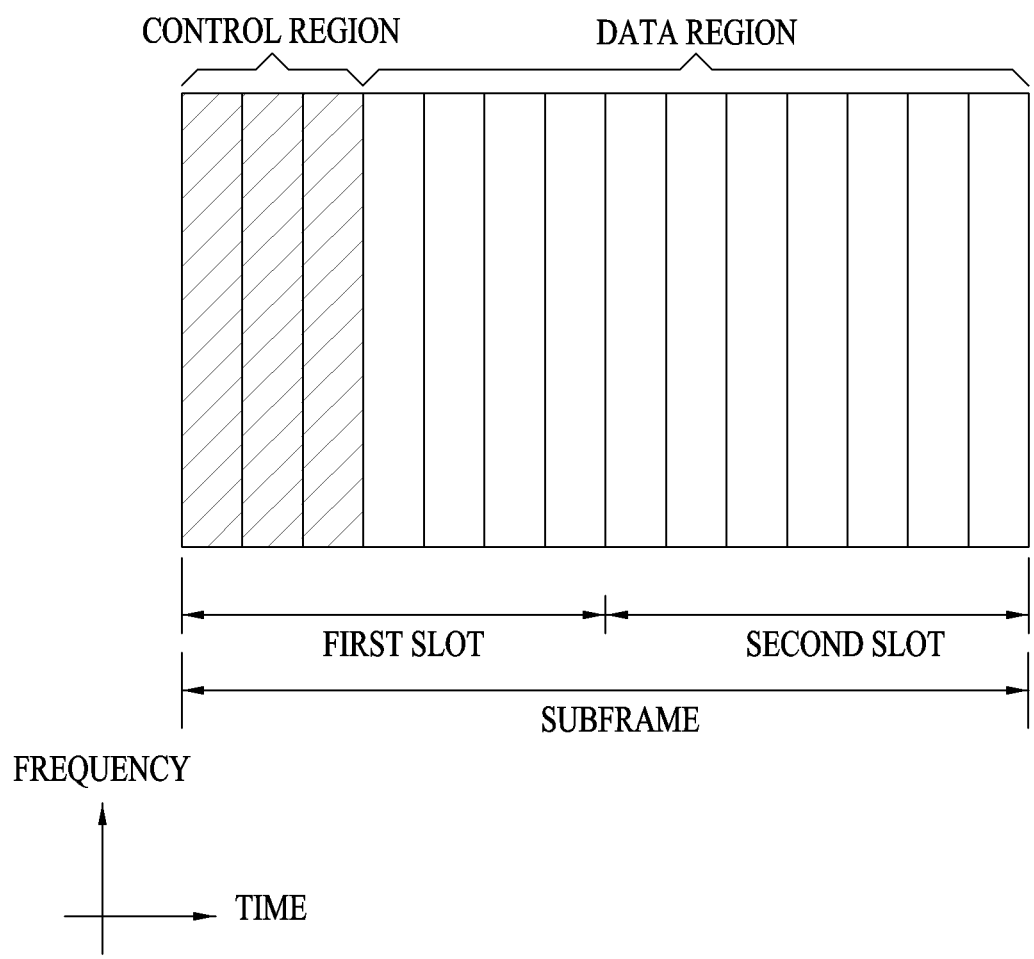
FIG. 5 is a diagram showing the structure of a downlink subframe.

FIG. 5 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 6 is a diagram showing the structure of an uplink frame.

The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the MIMO technology, a single antenna path is not used for receiving one message. Instead, in the MIMO technology, data fragments received via several antennas are collected and combined so as to complete data. If the MIMO technology is used, a data transfer rate may be improved within a cell region having a specific size or system coverage may be increased while ensuring a specific data transfer rate. In addition, this technique may be widely used in a mobile communication terminal, a repeater and the like. According to the MIMO technology, it is possible to overcome a limit in transmission amount of conventional mobile communication using a single antenna.

Among various technologies capable of improving data transmission efficiency, the MIMO technology can significantly improve communication capacity and transmission/reception performance without additionally assigning a frequency or additionally increasing power. By virtue of such technical merits, most companies or developers have focused on MIMO technology.

FIG. 7 is a diagram showing the configuration of a MIMO wireless communication system.

As shown in FIG. 7, $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1. Here, $R_i$ is the smaller of the two values $N_T$ and $N_R$.

$$R_i = \min(N_T, N_R) \quad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 7, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2.

$$s = [s_1, s_2, \ldots, s_{N_T}]^T \quad \text{[Equation 2]}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed by a vector shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Consider that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

where, $W_{ij}$ denotes a weight between an i-th transmit antenna and j-th information. W is also called a weight matrix or a precoding matrix.

This method will now be described according to the kind of MIMO technology. A method of transmitting one stream via several antennas is referred to as spatial diversity. In this case, the elements of an information vector $\hat{S}$ have the same value. A method of transmitting several streams via several antennas is referred to as spatial multiplexing. In this case, the elements of an information vector $\hat{S}$ have different values. Of course, a hybrid method which is a combination of spatial diversity and spatial multiplexing may be used. That is, the same signal is transmitted via three transmit antennas according to spatial diversity and the remaining signals are spatially multiplexed and transmitted.

In received signals, if the NR reception antennas are present, respective received signals $y_1, y_2, \ldots, y_{N_R}$ of the antennas are expressed as follows.

$$y = [y_1, y_2, \ldots, y_{N_R}]^T \quad \text{[Equation 6]}$$

If channels are modeled in the MIMO radio communication system, the channels may be distinguished according to transmission/reception antenna indexes. A channel from the transmission antenna j to the reception antenna i is denoted by hij. In hij, it is noted that the indexes of the reception antennas precede the indexes of the transmission antennas in view of the order of indexes.

FIG. 5(b) is a diagram showing channels from the NT transmission antennas to the reception antenna i. The channels may be combined and expressed in the form of a vector and a matrix. In FIG. 5(b), the channels from the NT transmission antennas to the reception antenna i may be expressed as follows.

$$h_i^T = [h_{i1}, h_{i2}, \ldots, h_{iN_T}] \quad \text{[Equation 7]}$$

Accordingly, all the channels from the NT transmission antennas to the NR reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Equation 8]

An Additive White Gaussian Noise (AWGN) is added to the actual channels after a channel matrix H. The AWGN $n_1, n_2, \ldots, n_{N_R}$ added to the NT transmission antennas may be expressed as follows.

$$n = [n_1, n_2, \ldots, n_{N_R}]^T$$ [Equation 9]

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The number of rows and columns of the channel matrix H indicating the channel state is determined by the number of transmission and reception antennas. The number of rows of the channel matrix H is equal to the number NR of reception antennas and the number of columns thereof is equal to the number NT of transmission antennas. That is, the channel matrix H is an NR×NT matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

The present invention proposes a method of finding a counterpart terminal (UE) when a terminal (UE) performs communication with another terminal (UE) using a direct wireless channel. Here, the terminal refers to a user terminal. When a network apparatus such as an eNB transmits and receives a signal according to a D2D communication method, the network apparatus such as the eNB may be regarded as a terminal. A directly connected link is referred to as a device-to-device (D2D) link and a link between a UE and an eNB is referred to as an eNB-UE link.

Figure 8:
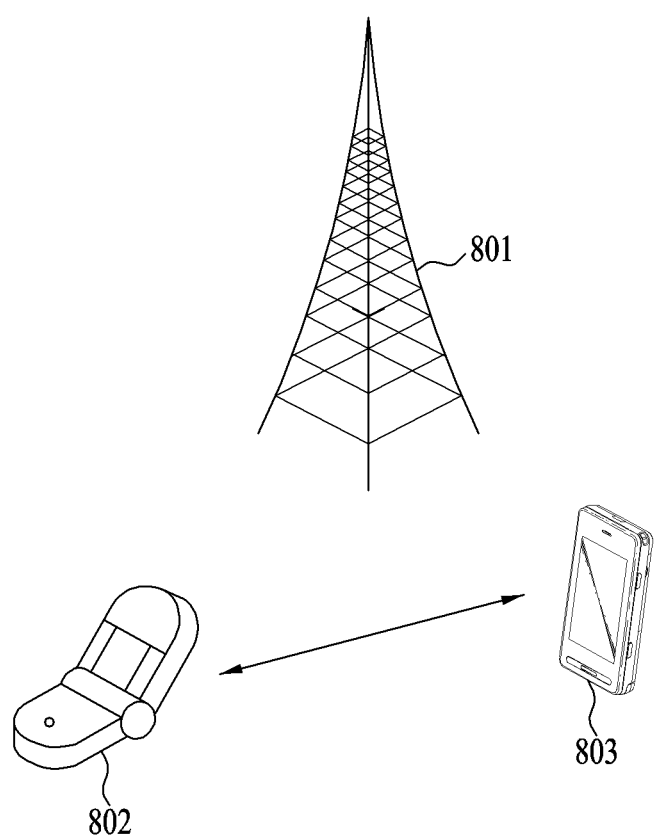
FIG. 8 is a diagram showing a communication system to which the present invention is applied.

FIG. 8 is a diagram showing a communication system to which the present invention is applied.

Referring to FIG. 8, a method of finding a counterpart UE when a UE performs communication using a direct radio channel will be described.

From the viewpoint of a specific UE, a D2D link and an eNB-UE link coexist in a wireless communication system. That is, when a counterpart UE is located at a position which cannot be connected via the D2D link, the UE should perform communication with the counterpart UE via the eNB-UE link while operating the D2D link with another UE.

In general, a wireless communication system uses two resources. More specifically, there are a downlink resource used for transmission from an eNB to a UE and an uplink resource used for transmission from a UE to an eNB. In an FDD system, the downlink resource corresponds to a downlink band and the uplink resource corresponds to an uplink band. In a TDD system, the downlink resource corresponds to a downlink subframe and the uplink resource corresponds to an uplink subframe. The downlink resource is used when the eNB transmits a signal using high transmit power and thus a UE having relatively low power cannot operate the D2D link due to a very high interference level. Accordingly, the D2D link operates using the uplink resource.

FIG. 9 is a diagram illustrating a method of detecting a boundary of an uplink subframe.

Referring to FIG. 9(a), a timing relationship between an uplink subframe and a downlink subframe will be described.

Transmission of an uplink radio frame i from a UE may precede the start point of a downlink radio frame in the UE by $(N_{TA} + N_{TA\ offset}) \times T_s$ seconds, which is referred to as a timing advance value. Here, $N_{TA}$ denotes a value delivered from an eNB to a UE via a timing advance instruction and the unit thereof is $T_S$ (basic time unit). $N_{TA\ offset}$ denotes a fixed timing offset value and the unit thereof is $T_S$. Here, $N_{TA}$ has a relationship of $0 \leq N_{TA} \leq 20512$, $N_{TA\ offset}$ is 0 for frame structure type 1 and is 624 for frame structure type 2.

Some slots of a radio frame may be transmitted. For example, in a TDD system, a subset of slots of a radio frame may be transmitted.

Referring to FIG. 9(b), a method of detecting a boundary of an uplink subframe at a UE will be described.

An uplink resource is composed of a plurality of uplink subframes. A UE connected to and synchronized with an eNB may receive a timing advance (TA) instruction from the eNB and detect the boundary of the uplink subframe.

A plurality of UEs may be located at different distances from the eNB. The eNB may transmit the TA instruction to each UE such that the signals transmitted by the plurality of UEs reach the eNB at the same time. Here, the TA instruction may instruct each UE to set the boundary of the uplink subframe earlier than the detection time of the boundary of the downlink subframe by a predetermined time. The eNB may set TA to an appropriate value to simultaneously receive the signals from the plurality of UEs. For example, the eNB may set TA to twice propagation delay between the UE and the eNB. In this case, since propagation delay between the eNB and each UE may be compensated for, the eNB may simultaneously receive the signals from the UEs.

For example, in FIG. 9(b), when the propagation delay value of UE 1 is 1, TA is set to 2. When the propagation delay value of UE 2 is 2, TA is set to 4. In this case, the eNB can simultaneously receive the signals from UE 1 and UE 2.

As described above, the UE may receive the TA instruction from the eNB and detect the boundary of the uplink subframe.

Adjacent UEs, e.g., D2D transmission and reception UEs are likely to have similar TA values. Accordingly, for synchronization between UEs, the subframe boundary of the D2D link may be determined based on the TA value. In particular, according to the above method, when the D2D link uses an uplink resource, the subframe boundary used by the D2D link and the subframe boundary used by the eNB-UE link are the same. Accordingly, operation for switching the two links in terms of time may be performed. More specifically, the D2D link may operate in a specific subframe and the eNB-UE link may operate in another subframe.

A UE which is not connected to the eNB should perform D2D operation. The UE which is not connected to the eNB cannot receive the TA instruction from the eNB. Hereinafter, a method of setting a subframe boundary for a D2D link at a UE which is not connected to an eNB will be described.

As one method, the UE which is not connected to the eNB may set the subframe boundary based on a TA instruction acquired via a random access procedure before performing D2D operation. However, such a method may cause additional time delay and battery consumption.

As another method, the UE which is not connected to the eNB may operate to set the subframe boundary without a TA instruction. Here, operation without the TA instruction may be interpreted in the following two manners in association with the description of FIG. 9(a).

First, in the description of FIG. 9(a), a sum of $N_{TA}$ and $N_{TA\ offset}$ may be interpreted to become 0 or to be fixed to a specific value. In addition, operation without the TA instruction may mean that a TA value is not specialized for a specific UE. This may mean that a plurality of unspecific UEs operates with the same TA value. More specifically, this may mean that the TA value is set to 0 such that the boundary of the downlink subframe received by the UE becomes the boundary of an uplink subframe. Alternatively, this may mean that the boundary of the downlink subframe received by the UE becomes the boundary of a D2D subframe. Alternatively, this may mean that a predetermined TA value is set via system information, etc.

$N_{TA}$ corresponding to the TA instruction from the eNB may be interpreted as becoming 0. As a result, this may mean that the TA value is determined by the $N_{TA\ offset}$ value which is a previously applied offset. Even in this case, as described above, the TA value is not specialized for a specific UE. Since $N_{TA}$ is equal to or greater than 0 in the description of FIG. 9(a), the TA value may be regarded as being a minimum value of possible values. D2D communication may be broadly divided into two processes. One process is a discovery process of detecting presence of an adjacent UE and the other process is a communication process of transmitting and receiving data to and from a specific UE. When D2D communication is performed without the TA instruction, one or both processes are applicable.

For example, the UE which is not connected to the eNB performs the discovery process without the TA instruction. However, when the counterpart UE is found via the discovery process, the UE which is not connected to the eNB may attempt to access the eNB, acquire a TA instruction and perform a communication process. In this case, a UE, which has been connected to the eNB to acquire a TA instruction in advance, may operate on the assumption that a TA instruction is not present. That is, for synchronization with the UE which is not connected to the eNB, the UE, which has been connected to the eNB to acquire the TA instruction in advance, may perform a specific process or all processes of D2D communication on the assumption that the TA instruction is not acquired.

In particular, when the UE connected to the eNB performs D2D communication according to the TA instruction, synchronization of the uplink subframe is equally maintained in D2D communication and eNB-UE link. Accordingly, influence of D2D communication on the eNB-UE link may be minimized. That is, when a specific subframe is used for D2D communication, an adjacent subframe maintaining the same subframe boundary as the boundary of the specific subframe may be used for the eNB-UE link. As a result, from the viewpoint of a UE for transmitting a D2D signal which does not require at least transmission/reception operation switching between the eNB-UE link and the D2D link, in D2D communication performed according to the TA instruction, the D2D signal may be transmitted via all resources in the subframe assigned for D2D communication.

Figure 10:
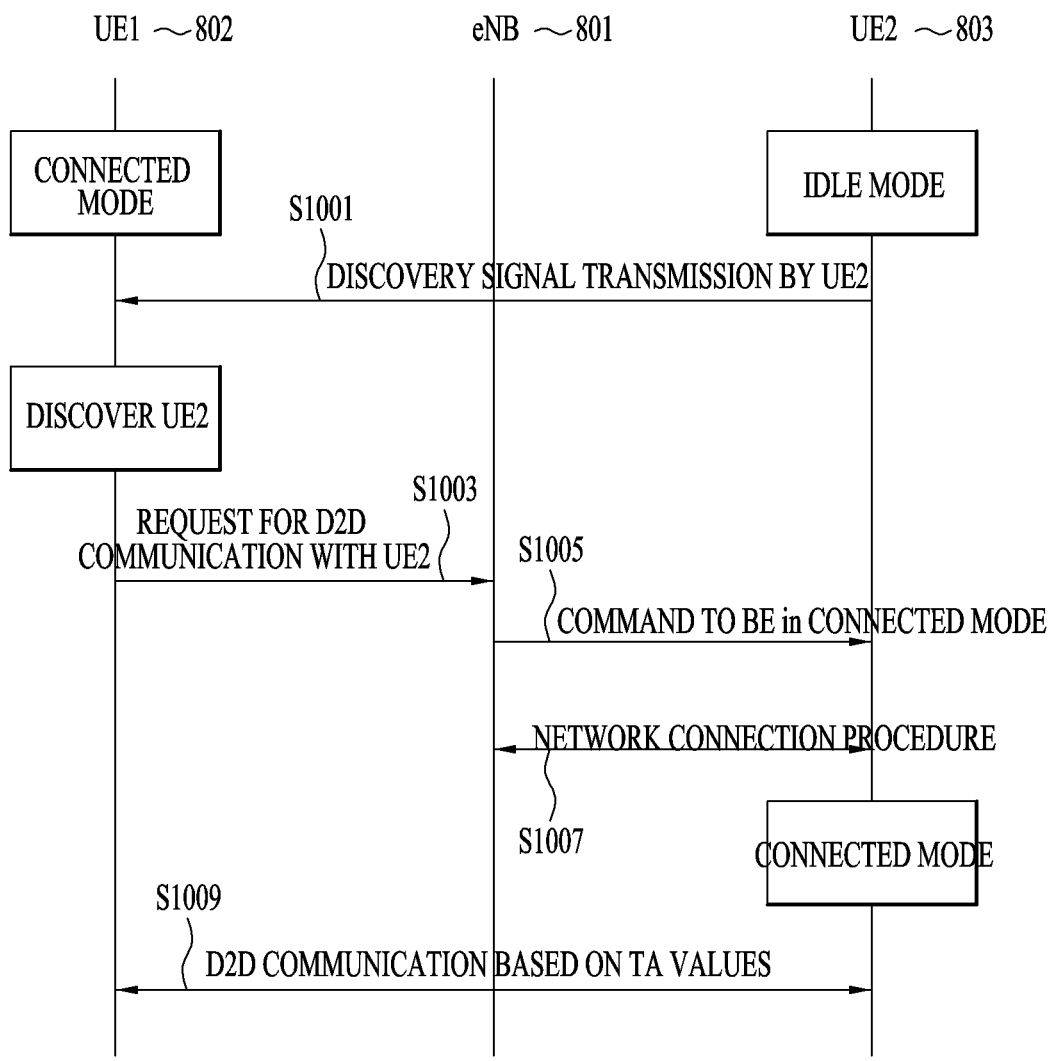
FIG. 10 is a diagram illustrating a method of notifying a counterpart user equipment (UE) of the state of a UE.

FIG. 10 is a diagram illustrating a method of notifying a counterpart UE of the state of a UE.

Referring to FIG. 10, the method of notifying the counterpart UE of the state of the UE will be described.

Assume that UE 1 is connected to the eNB and UE 2 is not connected to the eNB.

When the discovery process is performed without the TA instruction and the communication process is performed according to the TA instruction, the UE which is not connected to the eNB may confirm that the counterpart UE of D2D communication is not be connected to the eNB. In this case, the UE which is not connected to the eNB may attempt to access the eNB, acquire a TA instruction and perform communication based on a subframe boundary according to the TA instruction.

However, similarly to the discovery process, D2D communication may be immediately attempted without the TA instruction. That is, D2D communication between two UEs which are not connected to the eNB may be performed without the TA instruction as in the discovery process. This is because the two UEs are not connected to the eNB and thus D2D communication does not need to be performed according to the TA instruction in order to minimize influence due to the eNB-UE link operation.

In step S1001, UE 2 (803) may generate a signal which varies according to the state of UE 2 803 and transmit the signal to UE 1 802. UE 2 803 may generate the signal which varies depending on whether UE 803 is connected to the eNB, when generating a discovery signal. For example, the signal which varies according to an idle mode or a connected mode may be generated. Accordingly, UE 1 801, which has detected the discovery signal, may confirm the state of UE 2 (803).

Alternatively, the UE, which is connected to the eNB to perform uplink transmission according to TA, may also perform D2D communication without the TA instruction, when the currently used TA value is less than or equal to a predetermined level. On the assumption that the TA value is less than or equal to the predetermined level in the idle mode, if the TA used by the UE is less than or equal to the predetermined level, the UE may generate the discovery signal as in the idle mode. That is, when UE 2 803 generates the discovery signal, the signal which varies depending on whether the TA value used by UE 2 803 is less than or equal to the predetermined level may be generated.

In step S1003, UE 1 802 confirms the state of UE 2 803 and requests communication connection with UE 2 803 from the eNB 801.

When UE 1 802 is connected to the eNB 801 to perform D2D communication according to the TA instruction, UE 1 802 may attempt D2D communication with UE 2 803 and determine that UE 2 803 is in an idle mode. At this time, UE 1 802 may report that UE 2 803 is in the idle mode to the eNB. In addition, UE 1 802 may instruct the eNB 801 to attempt to access UE 2 803.

In step S1005, the eNB 801 may request entrance into the connected mode from UE 2 803. In step S1007, UE 2 803 performs a network connection procedure with the eNB 801 and enters the connected mode. In this case, the eNB 801 may deliver the TA value to UE 2 803 to request uplink subframe synchronization with the eNB. In step S1009, UE 1 802 may maintain the TA value and perform D2D communication with UE 2 803.

Hereinafter, a frame structure capable of performing D2D operation without the TA instruction will be described. More specifically, an FDD system and a TDD system will be described.

A. FDD System

Figure 11:
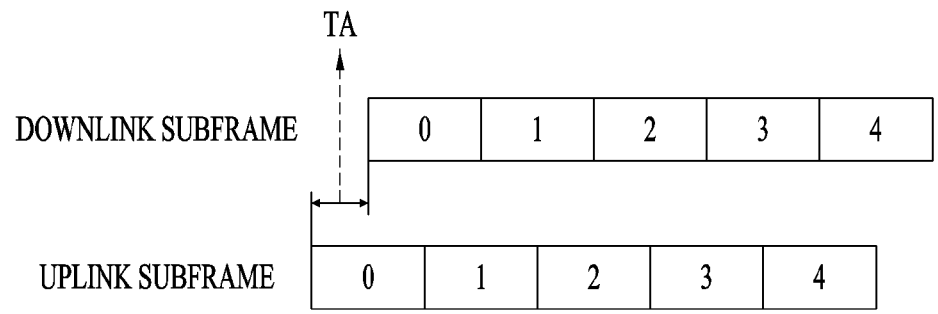
FIG. 11 is a diagram showing a boundary between a downlink subframe and an uplink subframe.

FIG. 11 is a diagram showing a boundary between a downlink subframe and an uplink subframe in a normal FDD system.

Referring to FIG. 11, it can be seen that the uplink subframe precedes the downlink subframe by a TA value.

Figure 12:
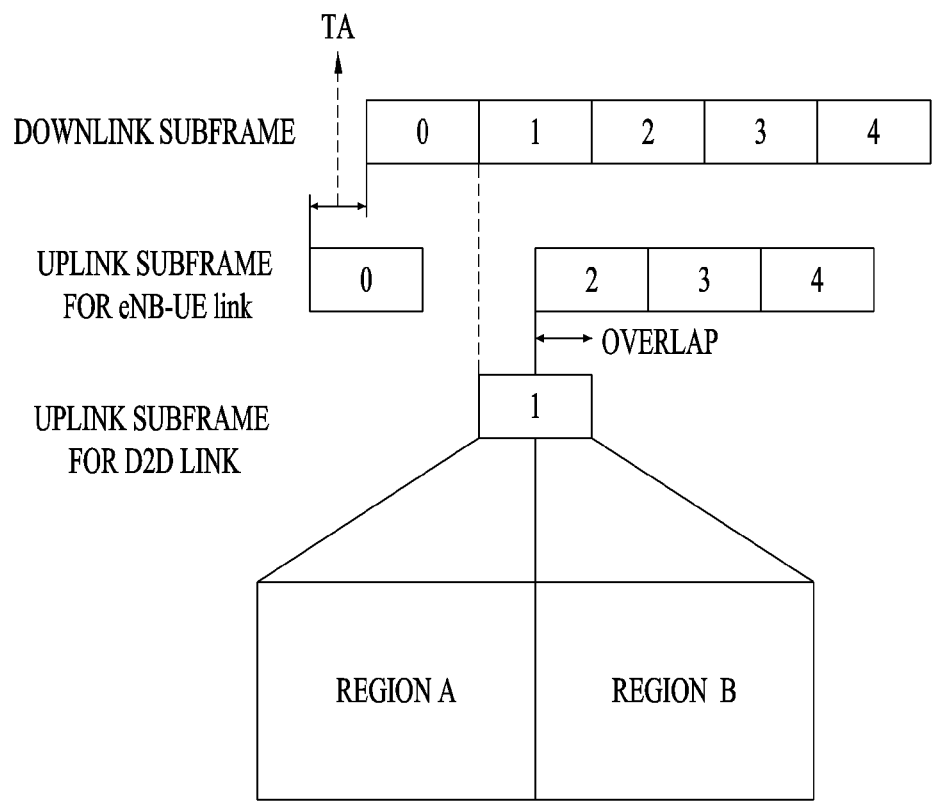
FIG. 12 is a diagram illustrating a method of assigning resources for D2D operation.

FIG. 12 is a diagram illustrating a method of performing D2D operation in a normal case.

Assume that, when D2D operation is performed, TA is 0 and the boundary of the uplink subframe for the D2D link coincides with the boundary of the downlink subframe.

Referring to FIG. 12, it can be seen that the rear part (hereinafter, referred to as a region B) 1201 of a subframe 1 for a D2D link overlaps a subframe 2 for an eNB-UE link. If the subframe 2 is used for the eNB-UE link, D2D operation is possible only in a front part (hereinafter, referred to as a region A) 1202.

Hereinafter, as shown in FIG. 12, a solution when the boundary of the uplink subframe for the D2D link does not coincide with the boundary of the subframe of the eNB-UE link will be described.

a. Method 1

Figure 13:
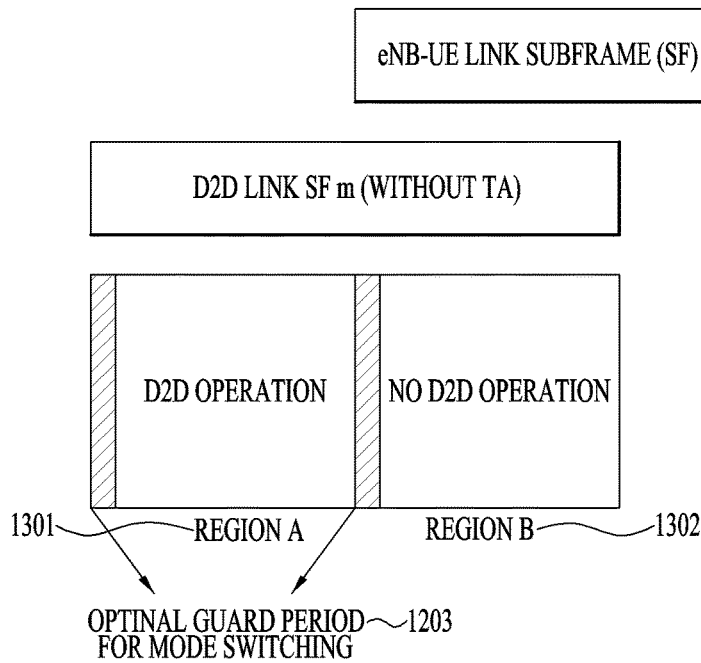
FIG. 13 is a diagram illustrating a method of performing resource assignment for D2D operation in detail.
Figure 13:
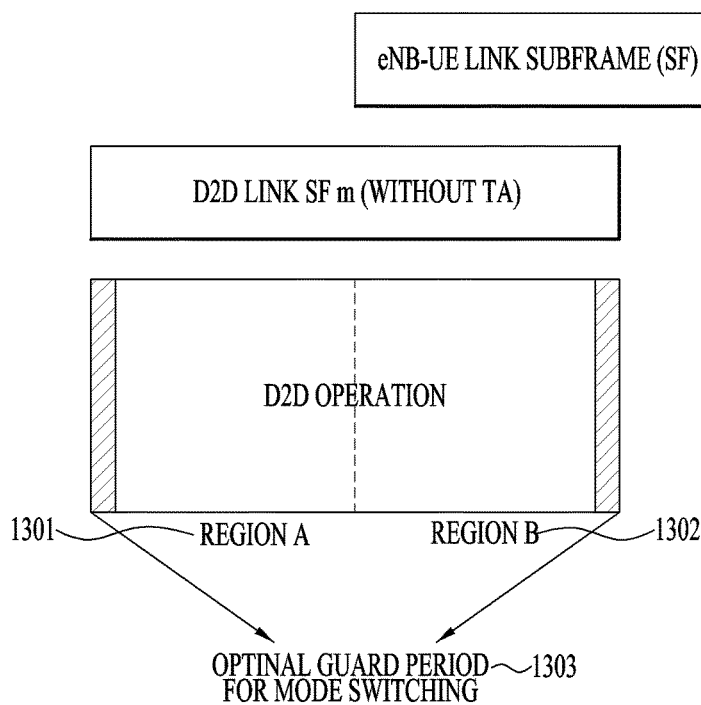
Figure 13:
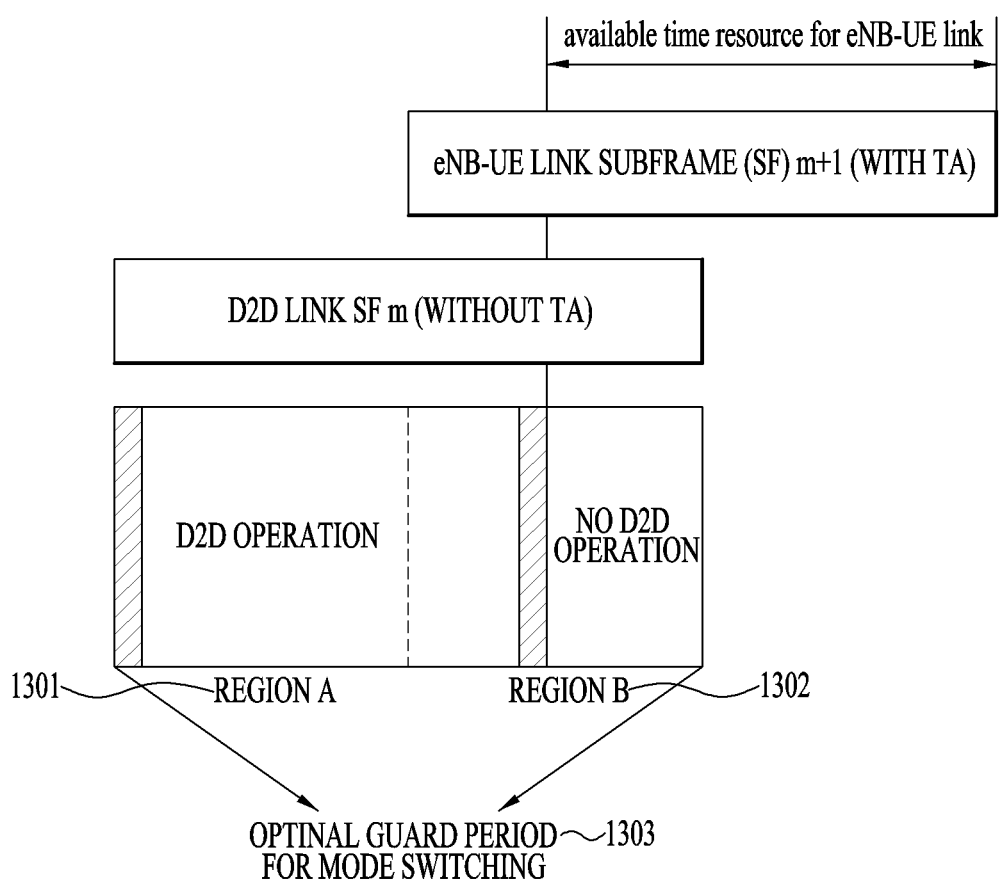
Figure 13:
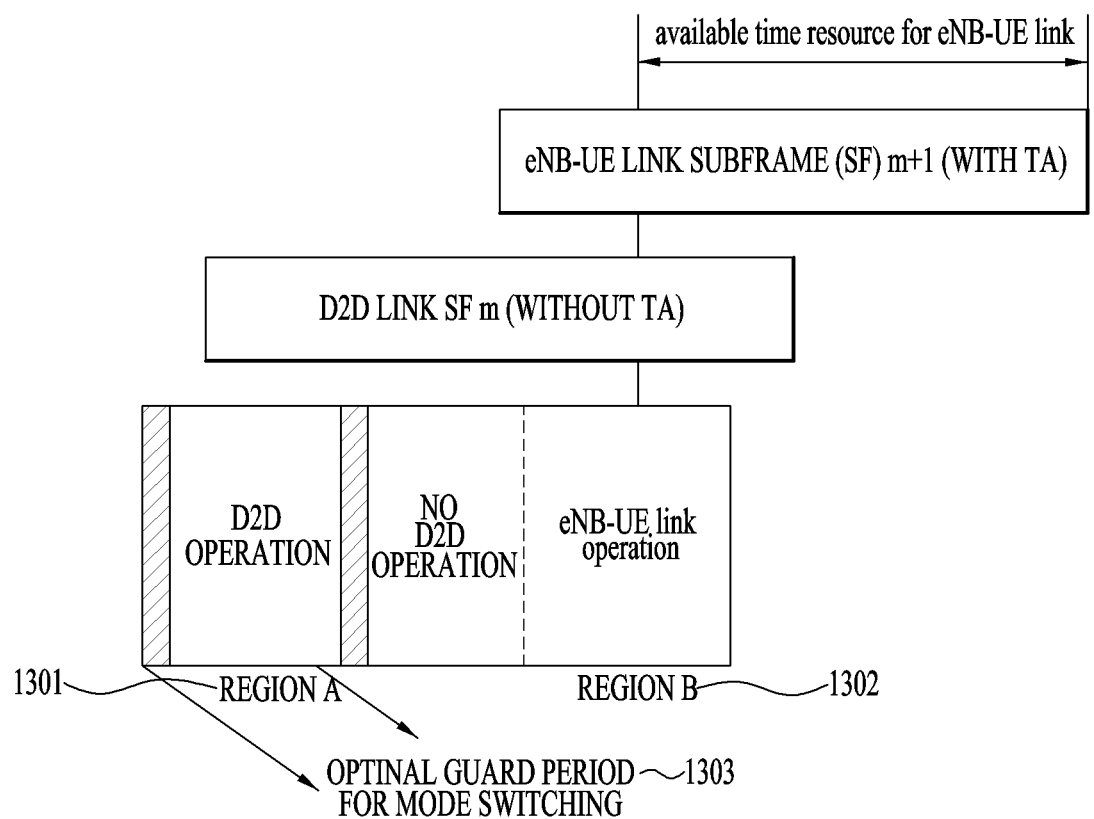

Referring to FIG. 13(*a*), it can be seen that the UE performs D2D operation only in a part in which the subframes do not overlap each other, such as a region A 1301 of FIG. 13.

The eNB may transmit at least one of location or length information of a region occupied by the region A 1301 in a subframe to the UE via a method of signaling radio resource control (RRC) or system information. The region B 1302 should include a subsequent eNB-UE link subframe of a UE having a maximum TA value. Accordingly, the eNB may set the length of the region A 1301 in consideration of a cell radius of the eNB.

Additionally, in the first and/or end part of the region A, a guard period (GP) 1303 may be set to perform switching between eNB-UE operation (e.g., eNB-UE link) and D2D operation (e.g., D2D link) during a partial time. The GP 1303 is essential for the UE to perform transmission and reception switching.

However, the GP may not appear in a UE which performs the same transmission operation or the same reception operation in two adjacent subframes. For example, a UE for continuously transmitting a signal on several subframes may perform signal transmission without the GP. However, a UE, which performs transmission operation and then switches to reception operation in an adjacent subframe, may set a partial time to the GP and receive a signal via the remaining region.

In the region B 1302, fundamentally, since the eNB-UE link operation should be performed in the subframe 2 shown in FIG. 12, a region B 1302 may not be used for the D2D link.

As described with reference to FIG. 13(*a*), operation for disabling the rear region of the D2D link subframe corresponding to the region B 1302 from being used for the D2D link may be restrictively performed only when the subsequent subframe is used for the eNB-UE subframe to which TA is applied. That is, when the subsequent subframe is a D2D link subframe to which TA is not applied or a downlink subframe on which the eNB transmits a signal without a TA value, overlap between subframes described with reference to FIG. 12 may not occur and the region B may not be present. Alternatively, in order to equally maintain the configuration of the D2D link subframe, the region B 1302 may be regarded as being present regardless of the kind of the subsequent subframe and D2D operation may be disabled in the region.

b. Method 2

Referring to FIG. 13(*b*), a method of performing D2D operation when the subframe of the D2D link does not coincide with the boundary of the subframe of the eNB-UE link will be described.

The UE may operate to use the region A 1301 and the region B 1302 for D2D. As a result, as shown in FIG. 13(*b*), there is a restriction on use of the subsequent subframe for the eNB-UE link. In order to solve this problem, the UE may not perform eNB-UE operation in the subsequent subframe, that is, subframe #m+1.

When the UE is instructed to transmit a specific signal in the subsequent subframe, transmission may be moved to a predetermined location (e.g., a next subframe) or may be omitted. The specific signal may include uplink ACK/NACK, periodic channel state information report, sounding reference signal (SRS) or semi-persistent scheduling, for example.

For more efficient resource use, eNB-UE operation may be performed using a partial time resource. The partial time resource may not overlap the region B 1302 of the time resource of subframe #m+1, for example.

Hereinafter, a method of performing eNB-UE operation using a partial time resource will be described in detail with reference to FIG. 13(*c*).

c. Method 3

FIG. 13(*c*) is a diagram illustrating another method of performing D2D operation.

Method 3 shown in FIG. 13(*c*) may be regarded as an intermediate form of Method 1 and Method 2. According to Method 3, the UE performs D2D operation in a part of the region B 1302.

Method 3 is efficient when the subsequent subframe described in Method 2 is partially used for the eNB-UE link.

Referring to FIG. 13(*c*), it can be seen that, when a part of the region B 1302 is used for D2D operation, there may be a restriction on operation of the eNB-UE link during a partial time of the start part of subframe #m+1.

As shown in FIG. 13(*c*), when the eNB-UE link operates only using a partial time, Method 3 may be efficient when the format of the signal transmitted and received via the eNB-UE link is restricted to several formats in advance. In particular, Method 3 may be efficient when the length of the used time is restricted in advance.

More specifically, as shown in FIG. 13(b), when the entire region B 1320 is used for D2D operation, the signal transmitted and received via the eNB-UE link in subframe #m+1 should have various types of signal formats. However, in this case, implementation of the UE may become complicated. Accordingly, the signal format used in subframe #m+1 may be restricted to one or several formats.

The UE may select a format suitable for a current situation from among the restricted signal formats. When the selected format occupies only a part of the region B 1302 as shown in FIG. 13(c), the remaining part is used for D2D operation along with the region A 1301.

An example of eNB-UE operation which may be performed using the partial time resource in the subsequent subframe of the D2D subframe will now be described.

As one method, a PUSCH or a PUCCH is transmitted and a format for transmitting the PUSCH or the PUCCH only using some rear symbols of one subframe is used. The PUSCH or PUCCH may be transmitted only on one slot using the property that a similar signal format is configured between two slots configuring one subframe in the form of changing the frequency location.

As another method, an SRS is transmitted only on one symbol. If a plurality of symbols is available in the subsequent subframe, the SRS may be transmitted on each symbol. The eNB may indicate how many symbols are used to transmit the SRS in the subsequent subframe.

As another method, a used PRACH preamble used only on several symbols is transmitted. Similarly, the eNB may indicate how many symbols are used to transmit the PRACH in the subsequent subframe.

Method 3 is efficient when the subsequent subframe described in Method 2 is partially used for the eNB-UE link.

d. Method 4

FIG. 13(d) is a diagram illustrating another method of performing D2D operation.

Method 4 corresponds to another intermediate form between Method 1 and Method 2. According to Method 4, the UE performs D2D operation only in a part of the region A 1301. Method 4 is efficient when the entire subsequent subframe described in Method 1 is used for the eNB-UE link.

Referring to FIG. 13(d), it can be seen that, since D2D operation is not performed in the region B 1302, the eNB-UE link operates in the entire region of subframe #m+1. This may be efficient when the format of the signal transmitted and received via the D2D link is restricted to several formats in advance. In particular, this may be efficient when the length of the used time is restricted in advance.

More specifically, as shown in FIG. 13(a), when the entire region A 1303 is used for D2D, the region occupied by the signal transmitted and received in subframe #m via D2D link may be changed according to an actually applied TA value. As a result, the signal transmitted and received via the D2D link should have various signal formats. However, in this case, implementation of the UE may become complicated. Accordingly, the signal format used in subframe #m needs to be restricted to one or several formats.

The UE may select a format suitable for a current situation from among the restricted signal formats. If the selected format occupies only a part of the region A 1301 as shown in FIG. 13(d), the remaining part may not be used for D2D.

The GP 1303 for switching the mode of the UE may only in the start point or end point of D2D operation or may not appear in the start point and the end point, in some cases. For example, in case of a UE capable of rapidly performing mode switching, the GP may not appear in the start point and end point.

Alternatively, an appropriate offset may be further applied to the subframe boundary of the D2D subframe such that a part or all of the GP may not appear.

Hereinafter, a method of assigning a resource for D2D operation will be described using embodiments.

1. First Embodiment

Figure 14:
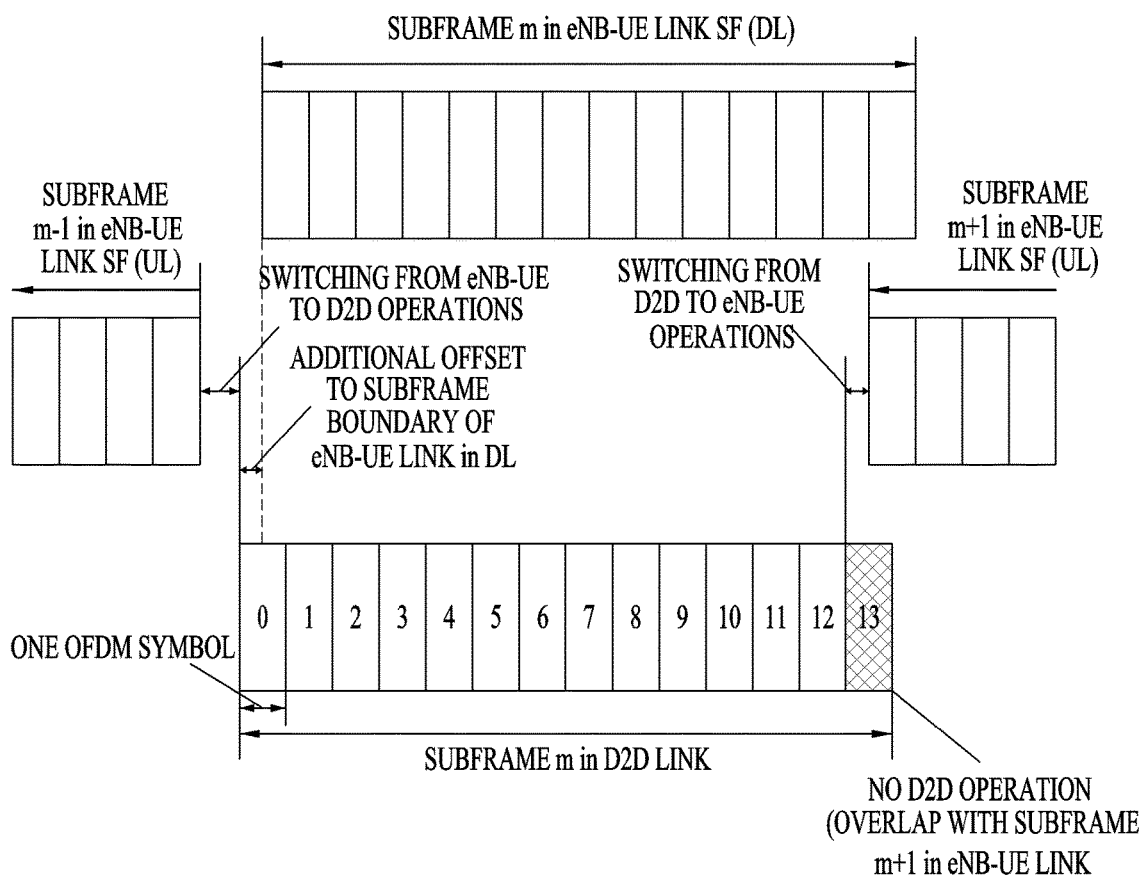
FIG. 14 is a diagram showing an example of performing resource assignment for D2D operation when a predetermined offset is applied.

FIG. 14 is a diagram showing an example of performing resource assignment for D2D operation when a predetermined offset is applied.

Assume that Method 1 is used and only the region A 1301 is used for D2D operation. In addition, assume that a time corresponding to less than half the symbol is consumed for mode switching. That is, assume that one last symbol of 14 symbols of one subframe is assigned to the region B and D2D operation is impossible in the last symbol. In other words, assume that TA is set to the length of one symbol and D2D operation is impossible in the last symbol. Although it is assumed that one subframe is composed of 14 symbols, the number of symbols configuring one subframe may be changed according to the configuration for D2D communication. In particular, the number of symbols configuring one subframe may be changed according to the length of a cyclic prefix (CP).

Referring to FIG. 14, the method of performing D2D operation when an offset is applied will be described. Assume that the subframe of the D2D link precedes the downlink subframe boundary of the eNB-UE link by a predetermined offset.

The UE performs operation of the eNB-UE link in downlink subframe #m−1 and then performs mode switching for D2D operation. In this case, the predetermined offset is applied at the reception time of the downlink signal in the eNB-UE link such that the boundary of D2D subframe #m appears earlier and D2D operation starts in the boundary. The UE performs D2D operation until symbol 12. Mode switching to the eNB-UE link is performed in the front part of symbol 13 which cannot be used due to partial overlap with uplink subframe #m+1 of the eNB-UE link. eNB-UE operation is performed in uplink subframe #m+1 starting after mode switching.

For operation described with reference to FIG. 14, a predetermined TA value or more should be applied. A mode switching time may be ensured between the end point of uplink subframe #m−1 of the eNB-UE link and subframe #m of the D2D link. The eNB may provide a TA instruction such that the predetermined TA value or more is applied to all UEs. This may be interpreted as meaning that the boundary of the uplink subframe of the eNB precedes the boundary of the downlink subframe. FIG. 14 shows operation of a UE having a minimum TA value among UEs connected to the eNB for performing this operation.

Figure 15:
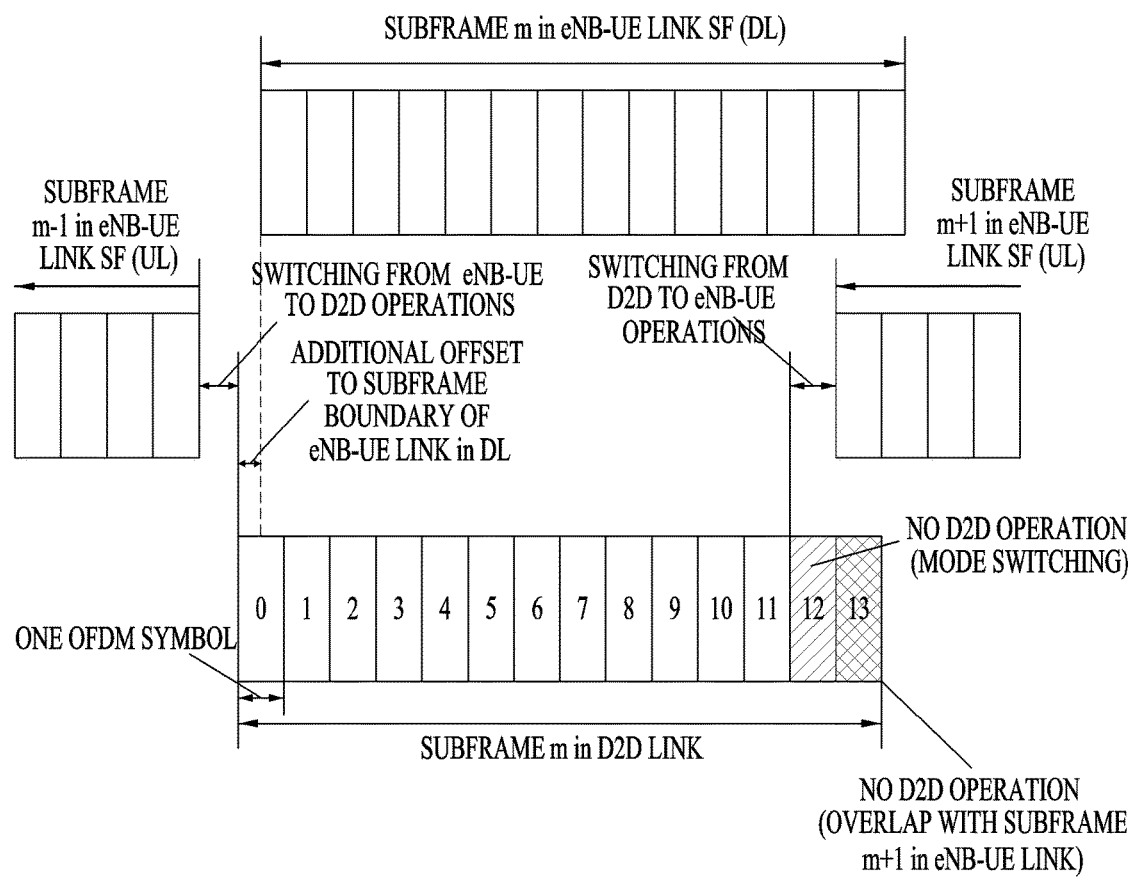
FIG. 15 is a diagram showing another example of performing resource assignment for D2D operation when a predetermined offset is applied.

A UE having a larger TA value should operate such that the number of symbols used for D2D operation is reduced in subframe #m as shown in FIG. 15. As shown in FIG. 15, when the TA value is set to a predetermined value or more, the number of available OFDM symbols used for D2D operation in subframe #m is changed.

2. Second Embodiment

FIG. 15 is a diagram showing another example of performing resource assignment for D2D operation when a predetermined offset is applied.

As described above, when the TA value is set to a predetermined value or more, the number of available OFDM symbols used for D2D operation in subframe #m is changed. In order to solve this problem, the following method is proposed.

Various formats of the transmitted and received signals in the D2D link may be generated and a format suitable for the number of available OFDM symbols may be selected. The TA value may be differently set according to UE. Accordingly, the eNB determines the format of the transmitted and received signal of the D2D link to be used based on a maximum TA value among the TA values of the UEs within the cell. Alternatively, the eNB determines the number of available OFDM symbols for D2D operation based on the maximum TA value of the UEs within the cell. The determined number of available OFDM symbols may be signaled to the UE via a signal such as system information or RRC.

The UE, which has received the determined number of available OFDM symbols, operates to transmit and receive the D2D signal according to the signal format transmitted by the eNB for accurate signal transmission and reception with the counterpart UE having a different TA value, although more symbols may be used for D2D operation according to the TA value of the UE. In general, symbols less in number than the number of OFDM symbols used according to the TA value of the UE are used.

In this case, when an excessively large number of D2D transmission and reception signal formats is generated, implementation of the UE may become complicated. Therefore, Method 4 is used to restrict the signal of a D2D transmission and reception signal to several formats and a most suitable format is used instead of using all available symbols for D2D operation. Some symbols may not be used for D2D operation.

Figure 16:
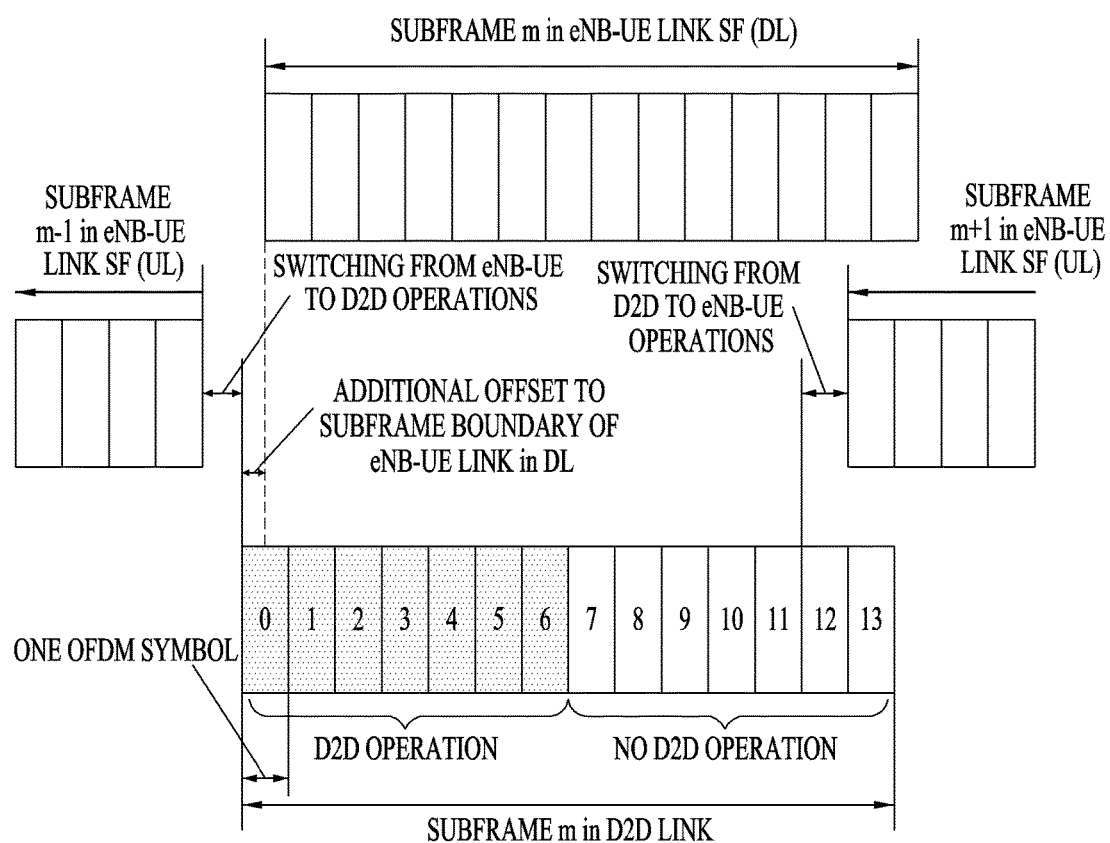
FIG. 16 is a diagram showing another example of performing resource assignment for D2D operation when a predetermined offset is applied.

FIG. 16 is a diagram showing another example of performing resource assignment for D2D operation when a predetermined offset is applied.

Referring to FIG. 16, a format most suitable for D2D operation according to the present invention will be described. Assume that the same TA as FIG. 15 is used. In this case, OFDM symbols 0 to 6 corresponding to half the front part of the subframe are used for D2D operation and the remaining symbols are not used.

In this case, if a relatively small TA value is used as shown in FIG. 17, OFDM symbols 0 to 12 may be used for D2D operation. Two types of D2D transmission and reception signal formats are used as shown in FIG. 17.

According to the second embodiment, some of the OFDM symbols used for D2D operation may be used for transmission/reception mode switching of the UE but may not be used for actual signal transmission and reception. In particular, symbol 6 may be used for transmission/reception mode switching.

FIG. 17 is a diagram showing the format of a D2D transmission and reception signal according to an embodiment of the present invention.

In FIG. 17, the format of the D2D transmission and reception signal is determined in the unit of one slot corresponding to half of one subframe. In addition, assume that a last symbol of one slot, e.g., symbol 6 or symbol 13 shown in FIG. 16, is used for mode switching for D2D or eNB-UE link transmission/reception operation in a next slot.

As a result, as shown in FIG. 17, if the TA value is small, D2D subframe format 1 is applied such that two slots may be used for D2D transmission and reception. In particular, since symbol 6 may be used for transmission/reception mode switching, the transmission/reception operation mode in each slot may be differently set. In contrast, as shown in FIG. 15, if the TA value is large, D2D subframe format 2 is applied such that only a front slot is used for D2D transmission and reception.

In particular, in the D2D subframe structure shown in FIG. 15, one slot corresponding to a relatively short time region is fundamentally used. Accordingly, this is applicable to the case in which a discovery signal for delivering a relatively small amount of signals is delivered. If the TA value is increased to apply D2D subframe format 2 using only one slot, a resource lack problem may be solved by assigning more subframes for D2D operation.

Hereinafter, this will be described in detail in a third embodiment.

3. Third Embodiment

Figure 18:
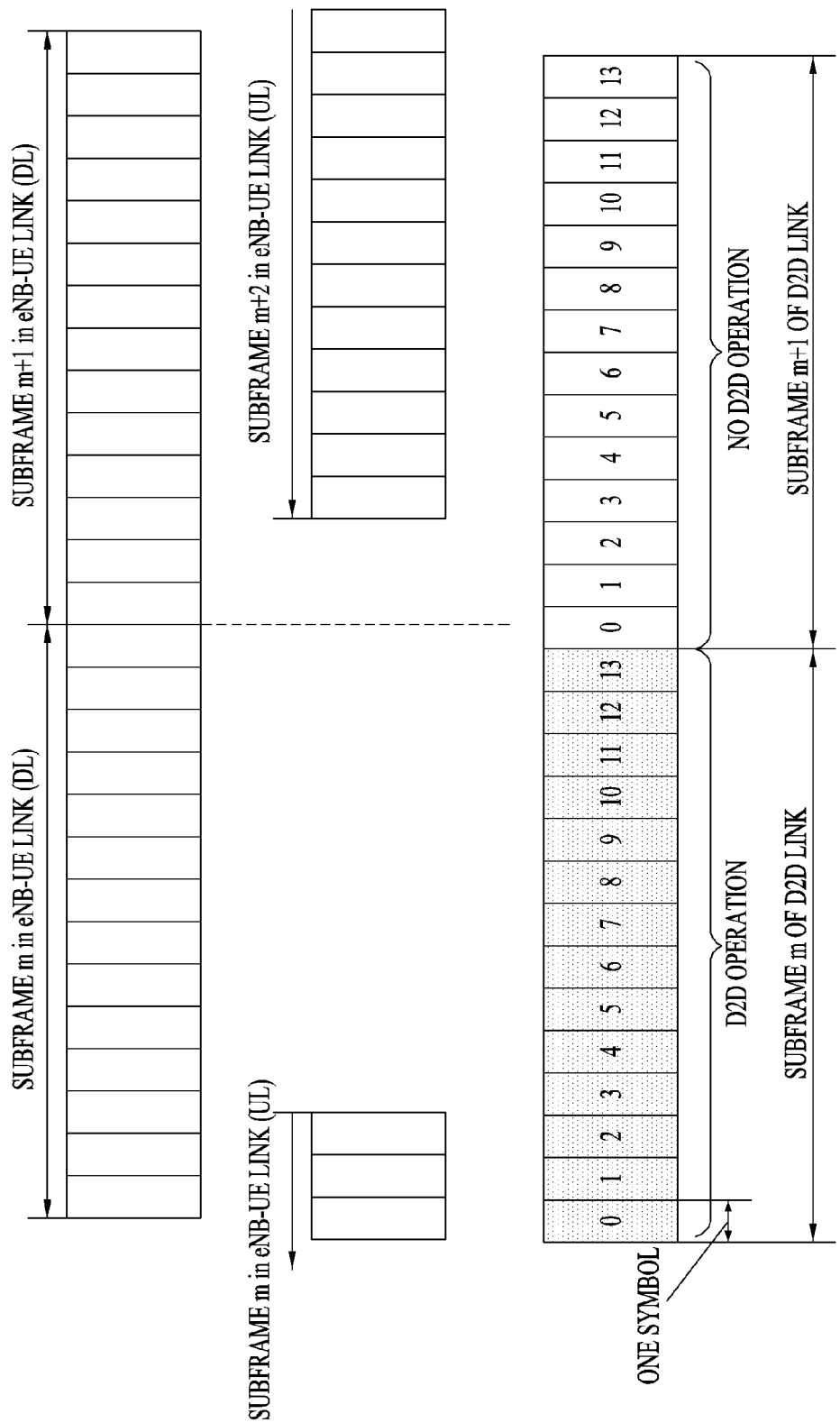
FIG. 18 is a diagram showing an example of performing resource assignment using consecutive subframes for D2D operation.

FIG. 18 is a diagram showing an example of performing resource assignment using consecutive subframes for D2D operation.

More specifically, as described above, a method of assigning more subframes for D2D operation when the TA value is increased will be described.

The TA value may be further increased such that a part of a first slot of a D2D subframe may overlap a region of an uplink subframe of a next eNB-UE link. In this case, as shown in FIG. 17, two consecutive subframes (e.g., subframe #m and subframe #m+1) may be assigned as D2D subframes. Actually, subframe #m+1 is not used for D2D operation and eNB-UE connection operation in subframe #m+2 should be performed in a most region of subframe #m+1.

D2D operation may be performed using subframe #m. In this case, since all symbols of the subframe may be used, in FIG. 16, D2D subframe format 1 is applicable to subframe #m. Subframe #m+1 is set as a D2D subframe but may be regarded as a null D2D subframe because no D2D operation is performed therein. In contrast, subframe #m+1 is not used for the eNB-UE link. Accordingly, subframe #m+1 following D2D subframe #m may be interpreted as being used for eNB-UE link. More specifically, as shown in FIG. 18, when the applied TA value exceeds a maximum TA value accommodated in the configuration of the D2D subframe, subframe #m+1 following D2D subframe #m may not be used for the eNB-UE link.

In consideration of such a situation, the eNB may notify the UE of which subframe is used as the D2D subframe. In particular, the eNB may notify the UE of the subframe used for D2D operation without the TA instruction. For example, the UE may be notified of which subframe is used for discovery operation. In addition, the UE may be notified of the format of each D2D subframe.

4. Fourth Embodiment

Figure 19:
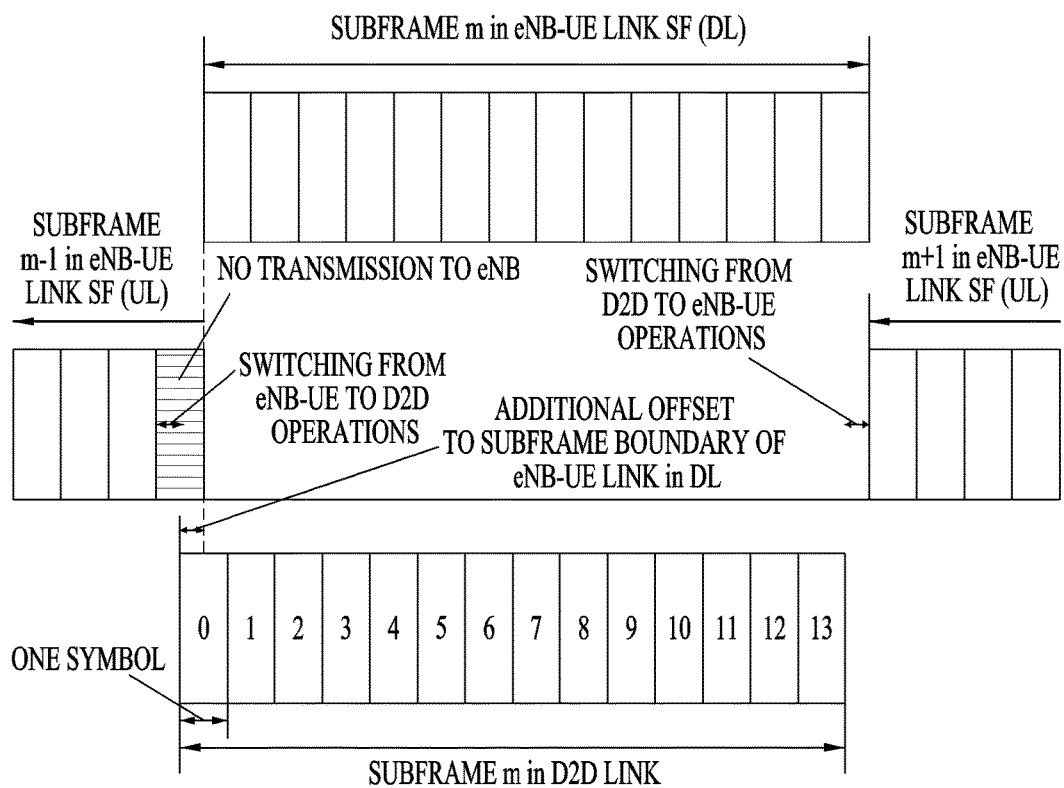
FIG. 19 is a diagram illustrating an example of restricting use of an adjacent subframe for D2D operation.

FIG. 19 is a diagram illustrating an example of restricting use of an adjacent subframe for D2D operation.

A method of performing D2D operation when the TA value is very small as in the description of FIG. 14 will be described.

When the TA value is very small, a last symbol of subframe #m−1 partially overlaps a first symbol of subframe #m. In this case, mode switching may be performed without using the last symbol of subframe #m−1.

In particular, this operation may be efficient when the UE, which has performed uplink transmission to the eNB in subframe #m−1, receives a D2D signal in subframe #m. This is because the UE, which has transmitted the D2D signal in subframe #m, does not require mode switching between subframe #m−1 and subframe #m.

Hereinafter, an example of operation of not using the last symbol of subframe #m−1 will be described. The eNB may configure subframe #m−1 as an SRS subframe such that the UE ends transmission of a PUSCH or PUCCH to the eNB before the last symbol of the subframe.

Assume that a specific UE performs D2D signal transmission in subframe #m. When a signal is transmitted to the eNB in subframe #m−1 and the TA value is less than or equal to a predetermined level (e.g., a mode switching time), the eNB may control the UE not to perform transmission in the last symbol of subframe #m−1. Such control may be performed via an SRS configuration. If the eNB does not perform control, operation may be automatically performed such that transmission is not performed. For example, the SRS may not be transmitted or PUSCH or PUCCH transmission may end in advance.

If the UE transmits a D2D signal in subframe #m, mode switching is not required. Accordingly, a part of the last symbol of subframe #m−1 may be used for transmission of the signal to the eNB. For example, operation may be performed to transmit the SRS. Alternatively, for unity of operation, transmission to the eNB in this symbol may not be performed.

This is different from FIG. 17 in that a part of the last symbol of subframe #m may be used for D2D operation. Accordingly, the eNB may appropriately control operations of FIGS. 17 and 18 according to the TA value. Alternatively, for unity of operation, the last symbol of subframe #m may not be used for D2D even when the TA value is small as shown in FIG. 18.

In the embodiments shown in FIGS. 14, 18 and 19, if the UE performs transmission and reception mode switching in one subframe, an appropriate symbol is set as an additional GP.

For example, assume that the subframe structure shown in FIG. 14 is used. When the UE performs different transmission and reception operations in the first half and second half of the subframe for D2D operation, the last symbol of the first half, that is, symbol 6, is not used for D2D signal transmission and reception but may be set as a GP, in order to equalize the symbol configurations of the first half and the second half.

Hereinafter, the case of applying the offset in an opposite direction will be described.

5. Fifth Embodiment

Figure 20:
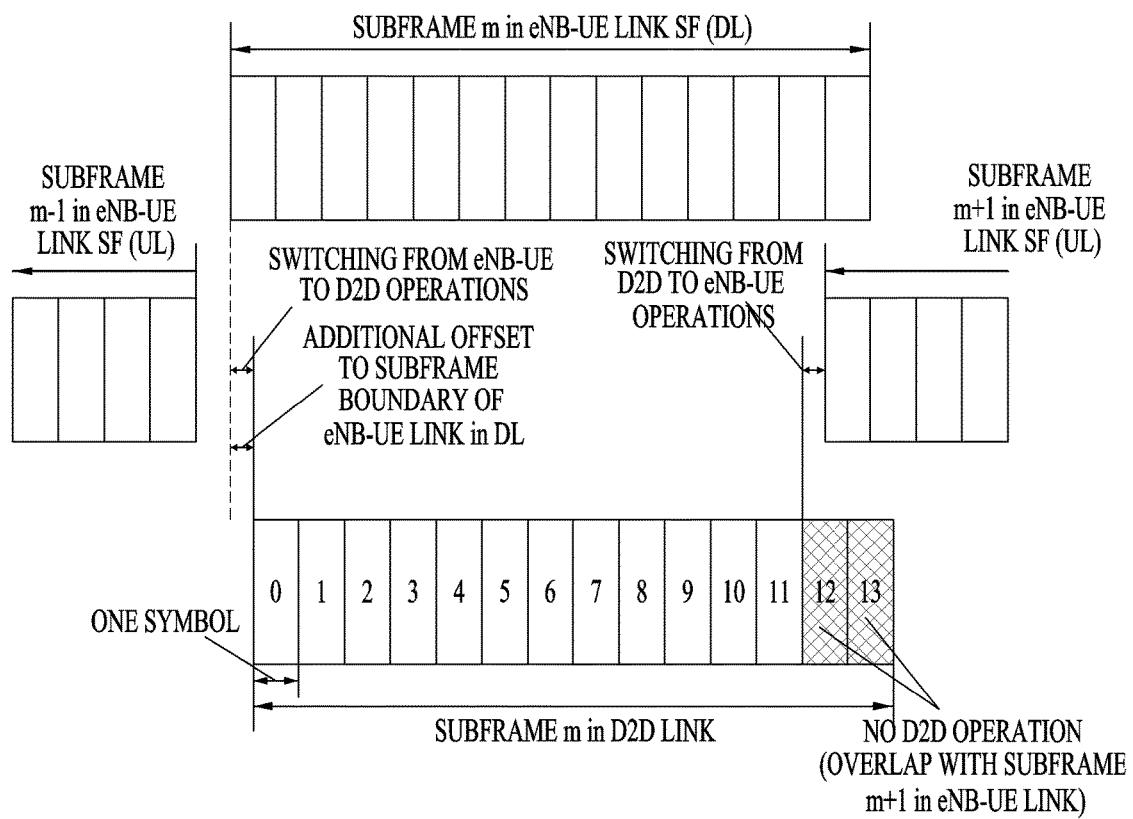
FIG. 20 is a diagram illustrating an example of performing resource assignment for D2D operation if an offset is applied in an opposite direction.

FIG. 20 is a diagram illustrating an example of performing resource assignment for D2D operation if an offset is applied in an opposite direction.

Assume that, in the same situation as FIG. 14, an offset is applied in an opposition direction. The offset may be applied in the opposite direction such that the D2D subframe starts later than the boundary of the downlink subframe by the offset.

The UE performs mode switching during a predetermined time on the assumption that the subframe of the D2D subframe starts later than the boundary of the received downlink subframe by the offset. Some last symbols of the subframe for D2D operation overlap the uplink subframe of the eNB-UE link and thus cannot be used for D2D operation. Mode switching is performed using some subframes which cannot be used for D2D operation. Accordingly, initial symbols are always used for D2D operation. If necessary, the location of the last symbol of the symbols which can be used for D2D operation may be appropriately set.

Operation described with reference to FIG. 20 is equal to that when the subframe for D2D operation starts from symbol 1 in operation described with reference to FIG. 14. That is, the subframe used for D2D operation starts earlier than the downlink subframe by the offset and the first symbol, that is, symbol 0, cannot be used for D2D operation.

As shown in FIG. 20, when the subframe for D2D operation starts later the eNB-UE link subframe by the offset, an appropriate format may be selected according to the set TA value of the formats shown in FIGS. 17 and 18.

As described above, the number and location of the symbols available in D2D signal transmission and reception are changed according to the TA value used by each UE. Accordingly, the eNB should set appropriate D2D signal transmission and reception symbols in consideration of the TA values of the UEs in the cell of the eNB. For example, the maximum TA value estimated by the eNB may be less than the actual maximum TA value of the UE.

In this case, the UE may not use some of the D2D symbols set for D2D operation set by the eNB. For example, the UE may not use some of the D2D symbols set by the eNB in consideration of the TA value of the UE and mode switching time.

When some of the D2D symbols set by the eNB may not be used, the UE may report this to the eNB. The UE may transmit report information to the eNB. Although the report information includes a current TA value, a mode switching time necessary for the UE, a total required GP time obtained by summing the current TA value and the mode switching time necessary for the UE and usage of D2D transmission and reception, the report information may include at least one of the length of a time interval which cannot be used by the UE or whether an unusable time interval is present. Additionally, the UE may notify the eNB of at least one of a D2D transmission and reception signal region having a maximum length or the kind of a D2D subframe format used in the current situation of the UE.

When applying the above-described embodiments of the present invention, a preamble may be transmitted before a D2D signal is transmitted. The preamble means a signal transmitted for a separate purpose before a D2D transmission UE transmits the real D2D signal for delivering control information or data information. More specifically, the preamble may be a signal transmitted for reception preparation operation of a reception UE before a D2D transmission UE transmits the real D2D signal for delivering control information or data information. The real D2D signal means a D2D signal for delivering control information or data information by the D2D transmission UE. In addition, the reception preparation operation includes time/frequency synchronization.

In general, the preamble is a signal previously known to transmission and reception UEs. The preamble is transmitted for an advance preparation process (or a reception preparation process) of a reception UE before a real signal is received. Accordingly, a transmission time is sufficient for the advance preparation process, a time corresponding to at least one OFDM symbol does not need to be occupied. The advance preparation process includes time/frequency synchronization or gain control of a reception amplifier.

Hereinafter, the embodiments of the present invention when the preamble is applied will be described.

6. Sixth Embodiment

Figure 21:
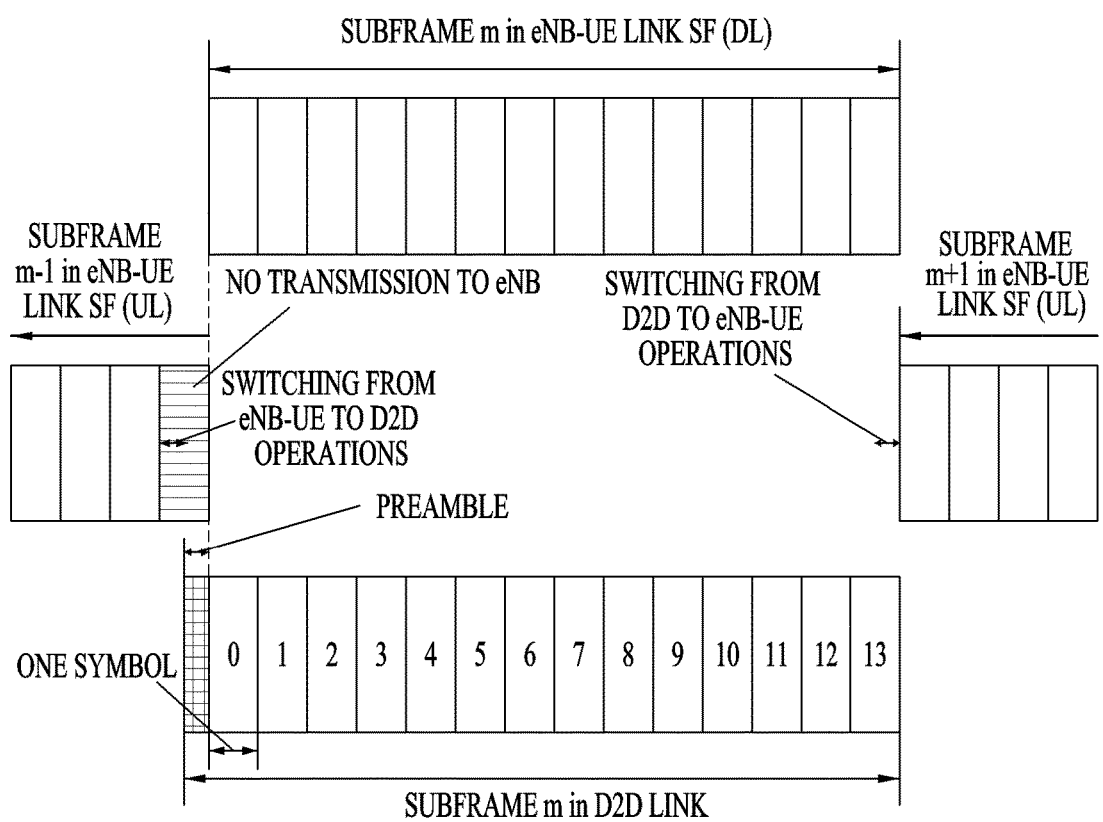
FIG. 21 is a diagram showing another example of performing resource assignment for D2D operation when a preamble is transmitted.

FIG. 21 is a diagram showing another example of performing resource assignment for D2D operation when a preamble is transmitted.

In FIG. 21, as shown in FIG. 14, a point earlier than the boundary of a downlink subframe acquired by the UE by a predetermined offset may be regarded as a start point of a D2D subframe. Alternatively, a point earlier than the boundary of the downlink subframe acquired by the UE by the predetermined offset may be regarded as a start point of D2D transmission.

Referring to FIG. 21, it can be seen that a preamble for an advance preparation process including synchronization is transmitted before transmitting real D2D symbols for real D2D signal transmission. In addition, it can be seen that symbol 0 of the real D2D symbols starts to be transmitted at the boundary of the downlink subframe acquired by the UE. Symbol 0 means a first symbol of the real D2D symbols. In other words, the length of the offset applied to the boundary of the downlink subframe coincides with the transmission time of the preamble.

In FIG. 21, assume that the UE acquires a TA value of 0. As a result, signal transmission to the eNB is impossible in the last symbol of subframe #m-1. Instead, transmission ends in a previous symbol thereof and a predetermined time is used for mode switching between transmission and reception. Thereafter, a next preamble is transmitted or received.

As shown in FIG. 21, a sum of the mode switching time between transmission and reception and the transmission time of the preamble may be equal to or less than a time corresponding to one OFDM symbol. When such a structure is appropriately used, it is possible to minimize loss of OFDM symbols due to mode switching and preamble.

As shown in FIG. 21, when it is assumed that symbol 13 of subframe #m overlaps subframe #m+1, symbol 13 cannot be used. Accordingly, a total of 13 symbols may be used. When the signal of the UE is not transmitted in subframe #m+1, symbol 13 of subframe #m may be used for D2D operation.

When a TA value greater than 0 is applied to the UE, a sum of the TA value and a mode switching time necessary between subframe #m and subframe #m+1 is less than or equal to a time corresponding to one OFDM symbol, symbol 13 may not be used for D2D operation. In this case, operation of the eNB-UE link may start to be performed at the first symbol, that is, symbol 0, of subframe #m+1.

7. Seventh Embodiment

Figure 22:
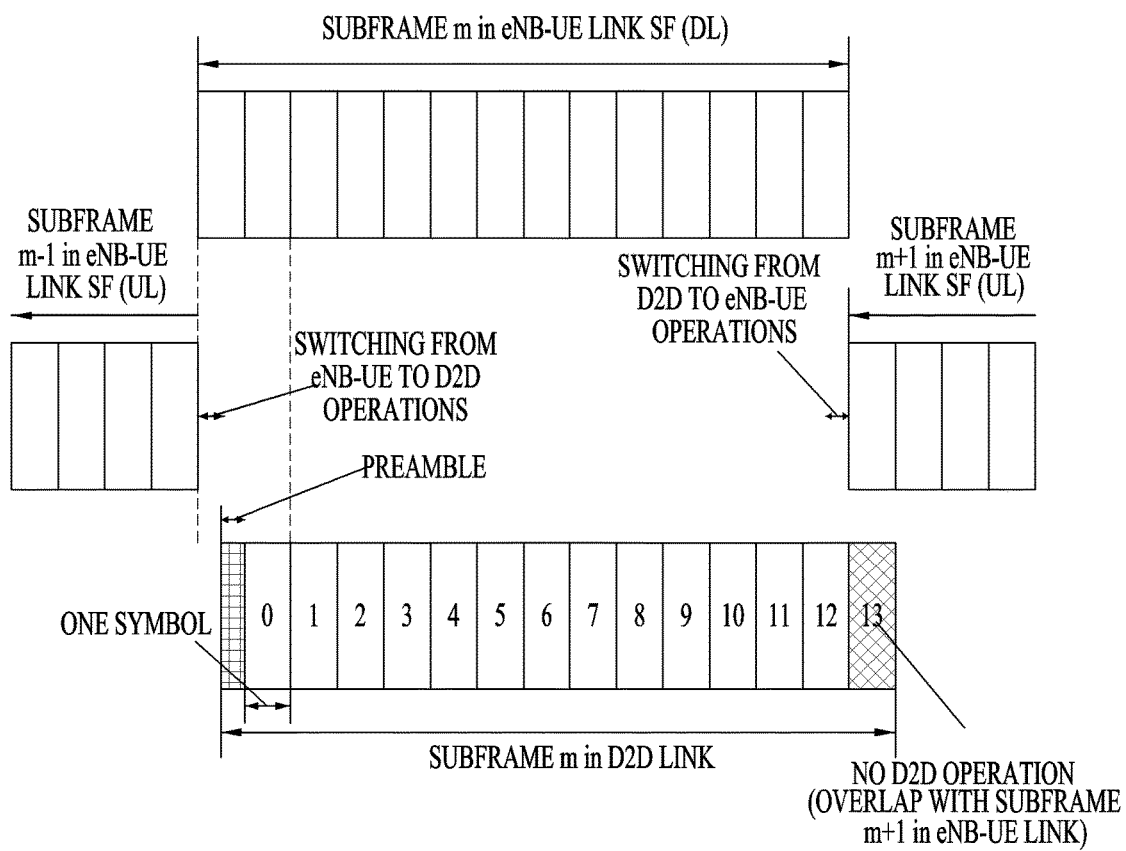
FIG. 22 is a diagram showing another example of performing resource assignment for D2D operation when a preamble is transmitted.

FIG. 22 is a diagram showing another example of performing resource assignment for D2D operation when a preamble is transmitted.

The principle of FIG. 20 is applied to FIG. 22.

As shown in FIG. 22, a point later than the boundary of the downlink subframe acquired by the UE by the predetermined offset may be regarded as a start point of the D2D subframe or a start point of D2D transmission.

A sum of the length of the offset and the transmission time of the preamble is equal to a time corresponding to one OFDM symbol. As a result, symbol 0 including a D2D signal is transmitted simultaneously with a second symbol of the downlink subframe.

When a mode switching period less than one OFDM symbol is necessary for the reception UE to perform switching between signal transmission operation to the eNB and D2D signal reception operation, the period excluding the mode switching time from the OFDM symbol time including the mode switching period is used to transmit the preamble. Therefore, it is possible to minimize loss of OFDM symbols due to the mode switching time and the preamble.

When transmission to the eNB by the transmission UE or the reception UE is performed in subframe #m+1, symbol 12 and symbol 13 cannot be used for D2D operation. In this case, switching between reception and transmission may be ensured using a partial time of symbol 12.

8. Eighth Embodiment

Figure 23:
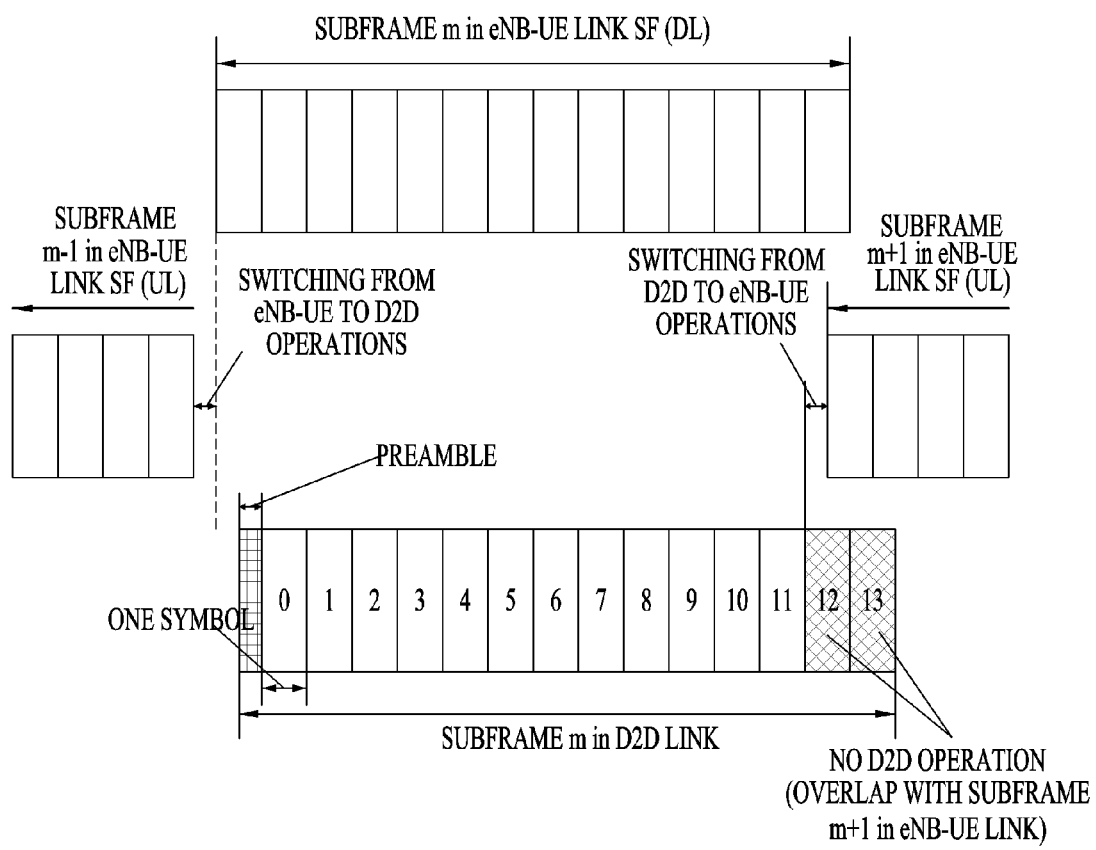
FIG. 23 is a diagram showing another example of performing resource assignment for D2D operation when a preamble is transmitted.

FIG. 23 is a diagram showing another example of performing resource assignment for D2D operation when a preamble is transmitted.

For description of FIG. 23, assume that a predetermined TA value is applied in the seventh embodiment.

Referring to FIG. 23, when the applied TA value is less than or equal to a difference between a time corresponding to one OFDM symbol and a time necessary for mode switching, symbol 0 to symbol 11 of subframe #m can be used. That is, a total of 12 symbols may be used.

Accordingly, the number of symbols used for D2D may be uniformly maintained except that the TA value is very large and thus a plurality of UEs may share the same format.

If the TA value is very large, the eNB needs to ensure that the UE uses a D2D subframe format using less symbols. Alternatively, the eNB needs to ensure that transmission to the eNB is avoided in subsequent subframe #m+1.

9. Ninth Embodiment

Figure 24:
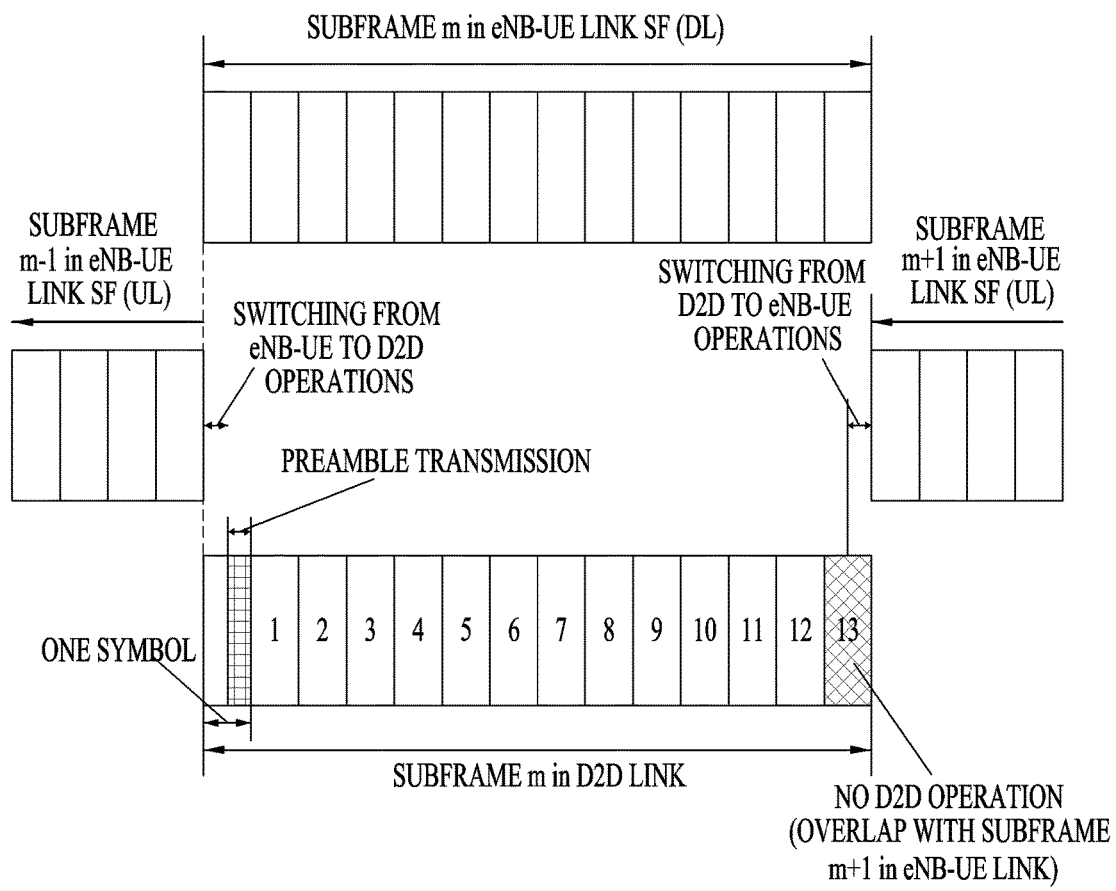
FIG. 24 is a diagram showing an example of restricting use of a first symbol of a subframe for D2D operation when a preamble is transmitted.

FIG. 24 is a diagram showing an example of restricting use of a first symbol of a subframe for D2D operation when a preamble is transmitted.

For description of FIG. 24, assume that a TA value of 0 is applied.

Referring to FIG. 24, it can be seen that subframe #m assigned for D2D operation has the same subframe boundary as the downlink subframe. Here, mode switching may be performed during a partial time of symbol 0 of subframe #m. A preamble may be transmitted using the remaining time.

This is equal to operation for transmitting a D2D signal including a preamble at a time delayed from the boundary of the downlink subframe by a predetermined offset. As a result, the number and location of symbols available for D2D operation are equal to those of FIG. 22.

That is, the preamble may start to be transmitted at a point later than the boundary of the downlink subframe by the offset. In addition, a first real D2D symbol starts to be transmitted at the same time as a second symbol of the downlink subframe. After a total of 12 symbols is transmitted or received, mode switching may be performed for transmission operation of subframe #m+1. The first real D2D symbol corresponds to symbol 0 in FIG. 22. In addition, the first real D2D symbol corresponds to symbol 1 in FIG. 24. FIGS. 22 and 24 are different in that the indices of the symbols used for D2D operation are different. In addition, FIGS. 23 and 25 are also different in that the indices of the symbols used for D2D operation are different.

According to the structure of FIG. 24, the first symbol and last symbol of subframe #m may not be used to deliver the D2D information. As a result, the structure of the subframe is symmetrical. In particular, this structure is advantageous in operation for changing a frequency region in slot units. In addition, the number of symbols available in two slots is identical.

10. Tenth Embodiment

Figure 25:
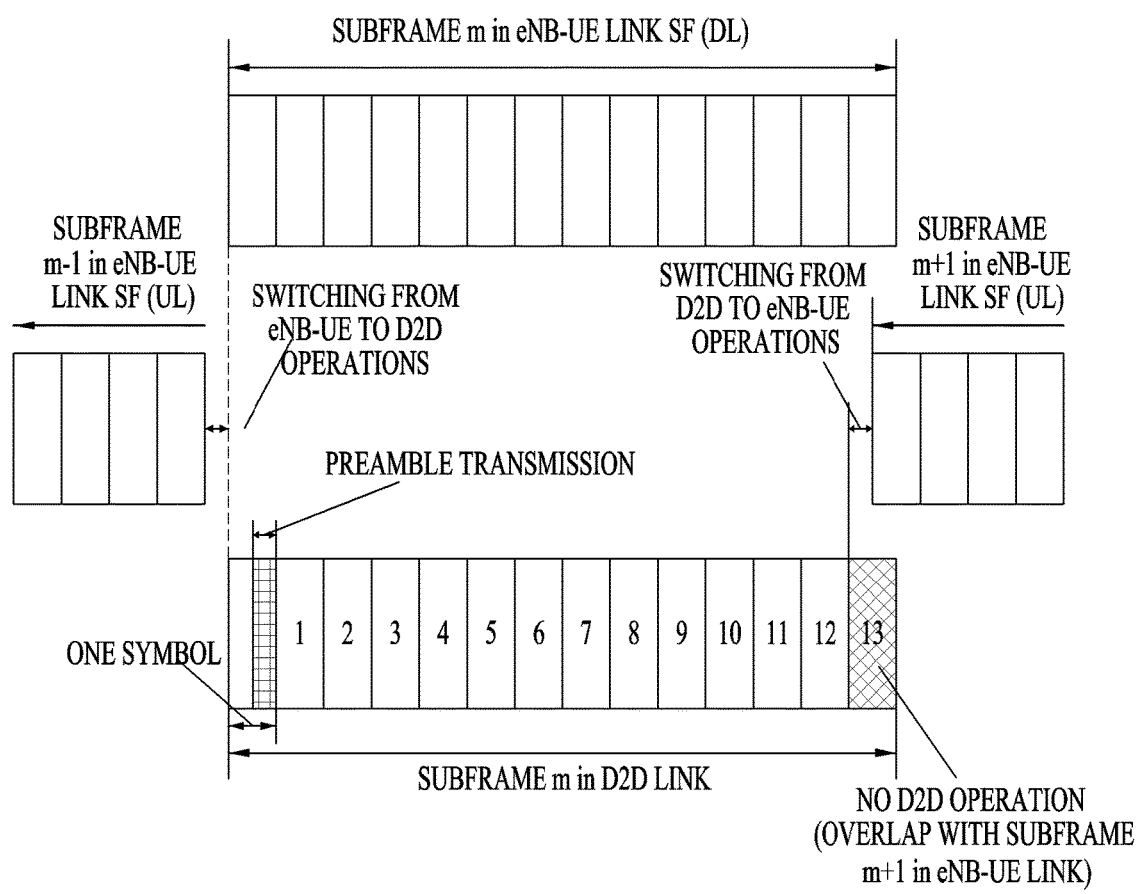
FIG. 25 is a diagram showing an example of restricting use of a first symbol of a subframe for D2D operation when a preamble is transmitted.

FIG. 25 is a diagram showing an example of restricting use of a first symbol of a subframe for D2D operation when a preamble is transmitted.

For description of FIG. 25, assume that a TA value greater than 0 is applied to description of FIG. 24.

Referring to FIG. 25, it can be seen that, when a sum of a TA value and a time necessary for mode switching is less than or equal to a time corresponding to one OFDM symbol, symbols 0 to symbol 12 are available. That is, all UEs to which a predetermined TA value or less is applied may share the same D2D subframe format.

When the TA value is greater than the predetermined level, the eNB needs to ensure that the UE uses a D2D subframe format using less symbols. Alternatively, the eNB needs to ensure that transmission to the eNB is avoided in subsequent subframe #m+1.

Operation for restricting D2D signal transmission for preventing influence on the subsequent subframe, that is, subframe #m+1, may be performed in smaller units. More specifically, in the above-described embodiments, when subframe #m is assigned for D2D operation, operation for restricting D2D signal transmission in the last partial time region of subframe #m may be performed in units smaller than one symbol.

Hereinafter, this operation will be described in detail.

11. Eleventh Embodiment

Figure 26:
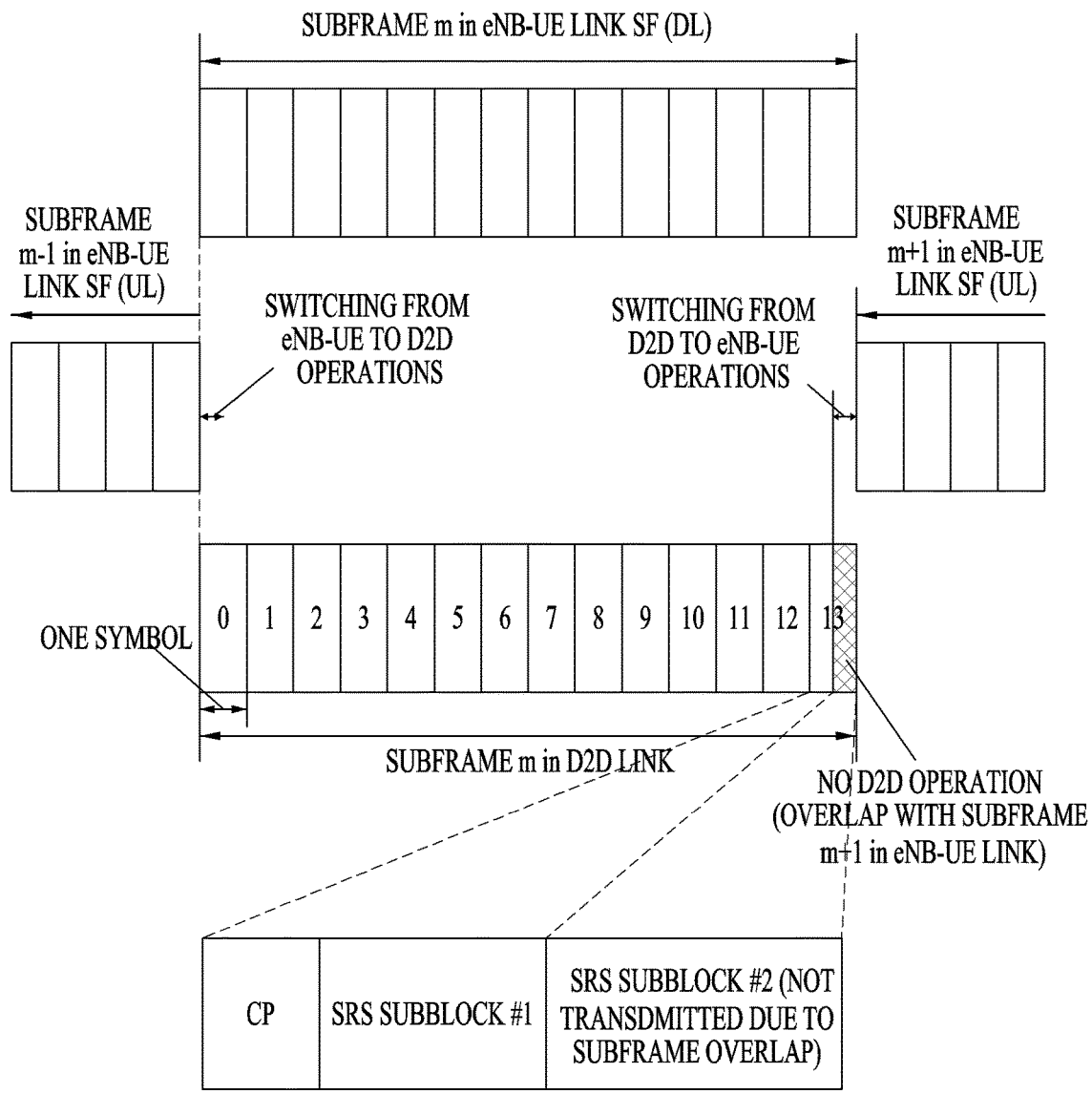
FIG. 26 is a diagram showing an example of performing resource assignment for D2D operation in a unit less than one symbol.

FIG. 26 is a diagram showing an example of performing resource assignment for D2D operation in units smaller than one symbol.

Referring to FIG. 26, a method of performing operation for restricting D2D signal transmission in a last partial time region in smaller units will be described.

As shown in FIG. 26, it can be seen that transmission of a D2D signal is possible in some front samples of symbol 1. The UE needs to ensure a time necessary for the UE to perform transmission and reception mode switching at the transmission end time of the D2D signal. Accordingly, after the time necessary for transmission and reception mode switching has elapsed, the TA value is appropriately controlled such that transmission of subframe #m+1 starts.

Transmission of the D2D signal using only some samples of one symbol is referred to as partial symbol transmission. Partial symbol transmission is suitable for sounding reference signal (SRS) transmission of legacy LTE.

The SRS is configured by applying one signal to two subcarriers once and applying 0 to the remaining subcarriers. In a time dimension, in transmission of the SRS, the same two signals repeatedly appear (a cyclic prefix may be present before repetition of the two signals). Accordingly, when the signals repeated in the existing SRS are transmitted only once in the time dimension, partial symbol transmission can be easily performed using an existing signal transmission circuit.

The principle of the partial symbol transmission is not restricted to SRS transmission and is applicable to transmission of another reference signal or a signal corresponding to a codeword. In this case, only a part of samples corresponding to one symbol of the signal is transmitted and a time corresponding to the remaining samples may be used to accommodate the TA of a next subframe and transmission and reception switching.

If the above-described methods are used, there may be a restriction on the eNB-UE operation of adjacent subframes when D2D operation is performed in only one subframe. The restriction may occur when the boundary of the D2D subframe for D2D operation does not coincide with the boundary of the subframe for eNB-UE operation. Accordingly, when D2D operation is performed in a series of consecutive subframes, consecutive D2D subframes may be set in the boundary of the same subframe, in order to reduce the restriction.

12. Twelfth Embodiment

Figure 27:
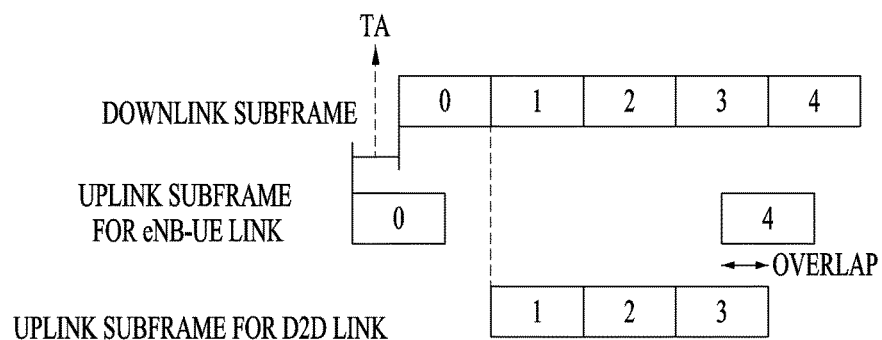
FIG. 27 is a diagram illustrating a method of performing resource assignment for D2D operation in consecutive subframes.

FIG. 27 is a diagram illustrating a method of performing resource assignment for D2D operation in consecutive subframes.

Referring to FIG. 27, a method of performing D2D operation with the same subframe boundary in a series of subframes will be described.

As shown in FIG. 27, it can be seen that subframe 1, subframe 2 and subframe 3 are consecutively used for D2D operation. In this case, the entire region of subframe 1 and subframe 2 may be used for D2D operation. Accordingly, the embodiments for solving overlap with the eNB-UE link are restrictively applied to the last subframe of a series of consecutive D2D subframes, such as subframe 3.

Operation for configuring the consecutive subframes as D2D subframes may be implemented by configuring a UL/DL configuration for TDD in a UL band in a TDD system.

For example, the eNB may configure the configuration shown in Table 3 or a new configuration in an FDD UL band.

Table 3 shows a UL/DL configuration applied to the present invention.

TABLE 3

| Uplink-downlink configuration | Downlink-to-Uplink Switch-point periodicity | Subframe number | | | | | | | |
|---|---|---|---|---|---|---|---|---|---|
| | | 0 | 1 | 2 | 3 | 4 | 5 | 6 | 7 |
| 0 | 4 ms | D | S | U | U | D | S | U | U |
| 1 | 4 ms | D | S | U | U | D | S | U | D |
| 2 | 4 ms | D | S | U | D | D | S | U | D |
| 3 | 8 ms | D | S | U | U | U | U | U | U |
| 4 | 8 ms | D | S | U | U | U | U | U | D |
| 5 | 8 ms | D | S | U | U | U | U | D | D |
| 6 | 8 ms | D | S | U | U | U | D | D | D |
| 7 | 8 ms | D | S | U | U | D | D | D | D |
| 8 | 8 ms | D | S | U | D | D | D | D | D |
| 9 | 8 ms | U | S | U | U | U | U | U | U |

In a DL subframe of the configuration, D2D operation may be performed using the same subframe boundary as the downlink subframe of the eNB-UE link in a DL band. Alternatively, D2D operation is performed using a subframe boundary modified using a predetermined offset.

In an uplink subframe of the configuration, D2D operation may be performed using the same subframe boundary as the uplink subframe of the normal eNB-UE link. Here, D2D operation performed in the downlink subframe may include at least one of discovery operation and communication operation.

Alternatively, while D2D operation may be performed based on the boundary of the downlink subframe without TA in the downlink subframe, D2D operation may be performed based on the boundary of the uplink subframe configured according to the TA applied to the UE in the uplink subframe.

For example, in the downlink subframe, D2D discovery operation may be performed without using a TA value optimized for an individual UE. In contrast, in the uplink subframe, D2D communication operation may be performed using the subframe boundary determined according to the TA value transmitted to the individual UE. In particular, in D2D communication operation between UEs connected to the eNB, D2D communication operation may be performed to use the subframe boundary determined according to the TA value transmitted to the individual UE in the uplink subframe.

Table 3 above is merely exemplary and the UL/DL configuration applied to the present invention is not limited thereto. For example, the UL/DL configuration in an LTE TDD system is applicable to the present invention.

Referring to FIG. 27, subframes 1 and 2 may be regarded as downlink subframes. Subframe 0 may be regarded as an uplink subframe.

Subframes in which overlap occurs, such as subframes 3 and 4, may be interpreted as follows.

When Method 1 described with reference to FIG. 13(a) is applied, subframe 3 may be regarded as a special subframe. A region A 1301 in which D2D operation is performed may be regarded as a downlink pilot time slot (DwPTS). The remaining time may be regarded as a GP to accommodate TA. A region B 1302 may be used for the eNB-UE link by subframe 4 corresponding to an uplink subframe.

When Method 2 described with reference to FIG. 13(b) is applied, an entire region of subframe 3 may be used for D2D operation. Accordingly, subframe 3 may be regarded as a downlink subframe. In this case, subframe 4 may be regarded as a special subframe. Since D2D operation is not performed in subframe 4, a DwPTS is not present. Subframe 4 may be regarded as a subframe composed of a GP and an uplink pilot time slot (UpPTS).

When Method 3 described with reference to FIG. 13(c) is applied, subframe 3 and subframe 4 may be regarded as special subframes. A UpPTS is not present in subframe 3 and a DwPST is not present in subframe 4. One super subframe obtained by connecting two subframes may be interpreted as a special subframe.

When Method 4 described with reference to FIG. 13(d) is applied, subframe 3 may be regarded as a special subframe and a partial region of a region A 1301 used for D2D operation may be regarded as a DwPTS. The remaining time of subframe 3 may be regarded as a GP to accommodate TA. A region B 1302 may be used for the eNB-UE link by subframe 4 corresponding to an uplink subframe.

In some cases, a region which belongs to the region A but is not used for D2D operation may be used as a UpPTS which is an uplink transmission period to the eNB. For example, a PRACH preamble or SRS using a small number of symbols may be transmitted. In particular, as shown in FIG. 17, when D2D subframe format 2 is applied, some last symbols of the region A may be set as a UpPTS and may be used for uplink signal transmission.

As described above, operation for configuring a TDD UL/DL configuration in an uplink band of FDD may be selectively performed only in a time period when D2D operation is performed. For example, the above-described UL/DL configuration is applicable to only a radio frame appearing at a predetermined period and all subframes may serve as uplink subframes in the remaining radio frame.

In uplink of FDD, HARQ is performed at a period of 8 ms. That is, retransmission of a PUSCH transmitted in subframe n is performed in subframe n+8. Accordingly, a TDD UL/DL configuration in an uplink band has a period of 4 ms, 8 ms or a multiple of 8 ms. When only a subframe belonging to a specific uplink HARQ process in the eNB-UE link is used for D2D operation, restriction on uplink HARQ in the eNB-UE link, which may occur while performing D2D operation, may be imposed on a specific process. The remaining processes may be performed without influence of restriction.

For example, one of the TDD UL/DL configurations shown in Table 3 may be configured in an FDD uplink band. As shown in Table 3, assume that the UL/DL configuration is repeated at a period of 4 ms or 8 ms. When the TDD UL/DL configuration appears at a period of a multiple of 8 ms, all subframes may be divided into groups of eight consecutive subframes and one of the configurations shown in Table 3 may be configured in some of the groups. In Table 3, a subframe number may be a value corresponding to the remainder when a sum of a value obtained by multiplying a radio frame number by 10 and a subframe number is divided by 8.

In Table 3, configuration #9 has one special subframe. In addition, configuration #9 has seven uplink subframes. The DwPTS of the special subframe is used for D2D operation according to the above-described methods and the remaining subframes may be used as normal uplink subframes. In this case, the location of the special subframe may be an arbitrary location and is not limited to the location shown in the table.

A method of more easily implementing operation similar to operation described with reference to FIG. 27 will be described.

Figure 28:
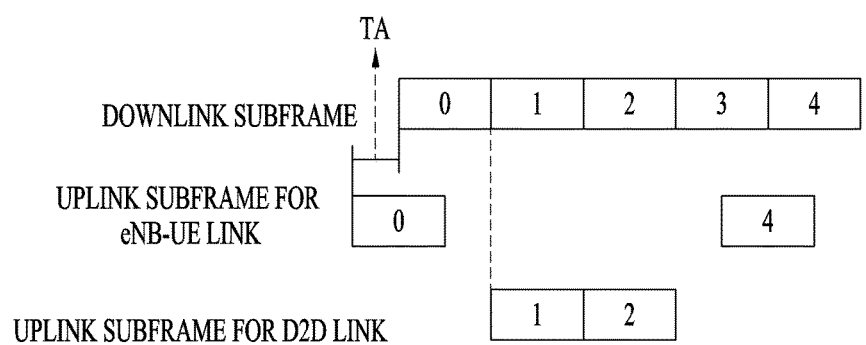
FIG. 28 is a diagram illustrating another method of performing resource assignment for D2D operation in consecutive subframes.

FIG. 28 is a diagram illustrating another method of performing resource assignment for D2D operation in consecutive subframes.

Referring to FIG. 28, a method of separating M consecutive uplink subframes in the eNB-UE link and performing D2D operation only in M–1 subframes will be described.

Although subframes 1, 2 and 3 are separated in the eNB-UE link in FIG. 28, it can be seen that subframes 1 and 2 are used for D2D operation. Subframe 3 may be used to accommodate TA of each UE.

According to the above-described method, one subframe cannot be used. However, various transmission and reception methods may not be implemented according to TA and related operation thereof may be simplified. In particular, the above-described method is suitable for intermittent D2D operation.

An additional UL/DL configuration indicating a D2D operation subframe in an uplink band by the above-described embodiments may be configured. When a subframe is configured as a downlink subframe for D2D operation and thus is entirely used for D2D operation, the subframe is used for D2D communication operation requiring a relatively large amount of resources. In contrast, when a subframe is located at the end of a series of D2D subframes and is used as a special subframe, the subframe may be used for D2D discovery operation requiring a relatively small amount of resources.

Although a specific time resource or a specific frequency resource is configured for D2D operation, when the resource is not actually used for D2D transmission and reception, the eNB may transmit data to the UE via the resource. Such operation is possible because the UE configures a subframe boundary at the same timing as the boundary of the downlink subframe of the eNB-UE link in the specific resource.

B. TDD System

Figure 29:
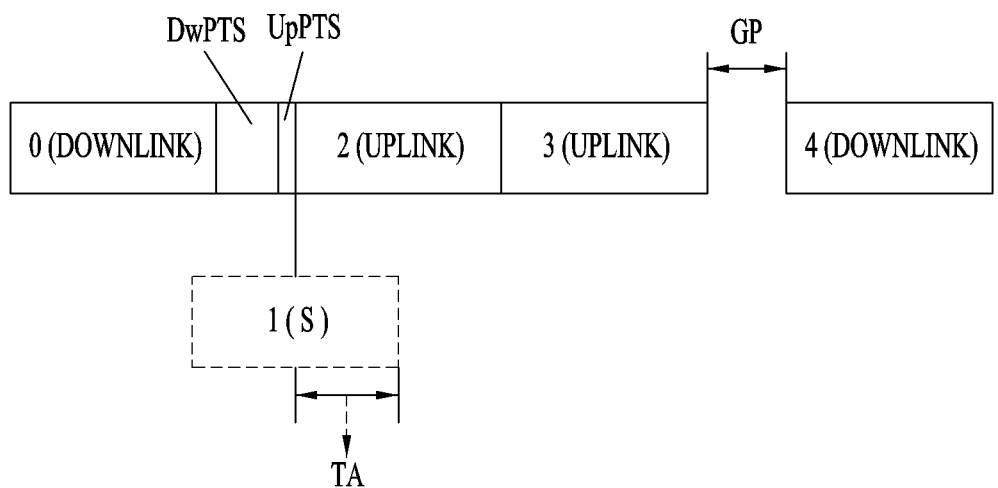
FIG. 29 is a diagram showing a boundary between an uplink subframe and a downlink subframe in a TDD system.

FIG. 29 is a diagram showing a boundary between an uplink subframe and a downlink subframe.

More specifically, in a TDD system, the boundaries of the downlink and uplink subframes are shown.

Referring to FIG. 29, it can be seen that an uplink subframe starts earlier than a downlink subframe by a TA value. Such mismatching may be solved by controlling a GP between a DwPTS and a UpPTS of a special subframe.

In case of TDD, the embodiments described in FDD is applicable to perform D2D communication.

TDD has the following two attributes. A subframe used for D2D operation is preferably an uplink subframe without interference from eNB transmission. A subframe used for operation without using TA specialized for an individual UE during D2D operation has the same subframe boundary as the downlink subframe or a subframe boundary obtained by applying a predetermined offset to the same subframe boundary as the downlink subframe.

In order to satisfy the two attributes, D2D operation may be performed using an uplink subframe configured in a UL/DL configuration configured by one eNB. A part of D2D operation, such as discovery operation, may be performed using an uplink subframe configured in the UL/DL configuration configured by the eNB. Operation may be performed using a last subframe of the consecutive uplink subframes and the boundary of the subframe may be set equally to the boundary of the downlink subframe as shown in FIG. 30.

Figure 30:
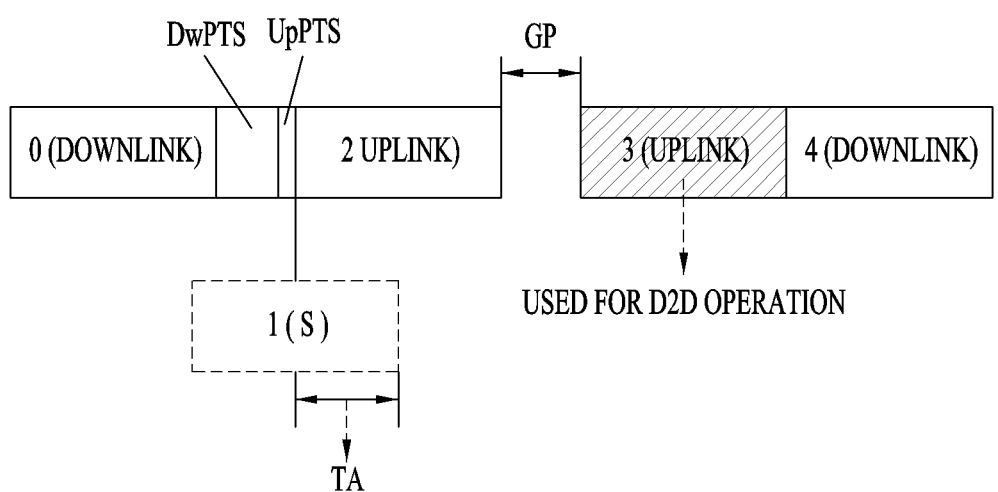
FIG. 30 is a diagram illustrating a method of assigning resources for D2D operation in a TDD system.

FIG. 30 is a diagram illustrating a method of assigning resources for D2D operation in a TDD system.

Assume that one subframe, that is, subframe 3, is selected for D2D operation. Consecutive subframes may be selected for D2D operation. As described in the embodiments of the FDD system, the boundary obtained by applying the predetermined offset to the boundary of the downlink subframe may be configured as the boundary of a D2D subframe for D2D operation. The offset value applied to the D2D subframe may correspond to a minimum TA value of the UEs connected to the eNB.

In particular, when the structure shown in FIG. 30 is used, an uplink subframe assigned to the eNB-UE link may not be present after an arbitrary D2D subframe. Accordingly, it is possible to prevent a subframe overlap problem which may occur when an uplink subframe of the eNB-UE link using TA appears after a D2D subframe without using TA. As a result, the eNB may use a configuration in which as many symbols as possible are used for D2D operation regardless of the TA value of the cell. For example, D2D operation may be performed in all symbols included in the last D2D subframe among the consecutive uplink subframes. Further, D2D operation may be performed in all symbols included in the D2D subframe.

For example, the former format of the two D2D formats shown in FIG. 17 may be always used. Alternatively, as the description of FIG. 26, partial symbol transmission may be maximally used. Alternatively, in the description of FIG. 18, when a predetermined TA value or more is applied, scheduling of the eNB-UE link may be freely performed without a restriction that eNB-UE link transmission cannot be performed in a next subframe.

Even in a TDD system, operation similar to operation for configuring a TDD UL/DL configuration in an uplink band in the description of the FDD system is possible. The eNB notifies the UE of one UL/DL configuration in order to indicate usage of each subframe. That is, the eNB notifies the UE of a first UL/DL configuration in order to indicate whether each subframe is used for signal transmission of the eNB or whether each subframe is used for signal transmission of the UE.

Thereafter, the UE is notified of a second UL/DL configuration which is an additional UL/DL configuration. As a result, the UE may be notified that D2D operation may be performed using the same subframe as the downlink subframe of the eNB-UE link in a downlink subframe configured in the configuration.

There is a restriction that the subframe configured as the uplink subframe in the second UL/DL configuration is necessarily configured as the uplink subframe in the first UL/DL configuration in order to ensure that the subframe has the same boundary as the uplink subframe of the eNB-UE link.

Preferably, D2D operation may be configured in downlink in the second UL/DL configuration in order to use the downlink subframe boundary of the eNB-UE link. A part of D2D operation, such as discovery operation, may be configured in downlink in the second ULDL configuration in order to use the downlink subframe boundary of the eNB-UE link. However, actually, in order to ensure that signal transmission of the eNB is not performed, D2D operation may be configured in uplink in the first ULDL configuration for specifying usage of each subframe. Alternatively, in order to ensure that transmission of a CRS or a CSI-RS transmitted via at least an entire band is not performed, D2D operation is configured in uplink in the first UL/DL configuration for specifying usage of each subframe.

When a D2D discovery signal is transmitted from a UE located outside eNB coverage, a subframe transmitted to the eNB with TA is not present. Accordingly, in order to prevent overlap of subframes due to TA applied to eNB-UE link transmission, D2D operation may be required to be performed similarly to the description of FIG. 30.

As a result, a configuration in which as many symbols as possible are used for D2D operation may be used. For example, the former format of the two D2D formats shown in FIG. 17 may be always used. Alternatively, as description of FIG. 26, partial symbol transmission may be maximally used.

Figure 31:
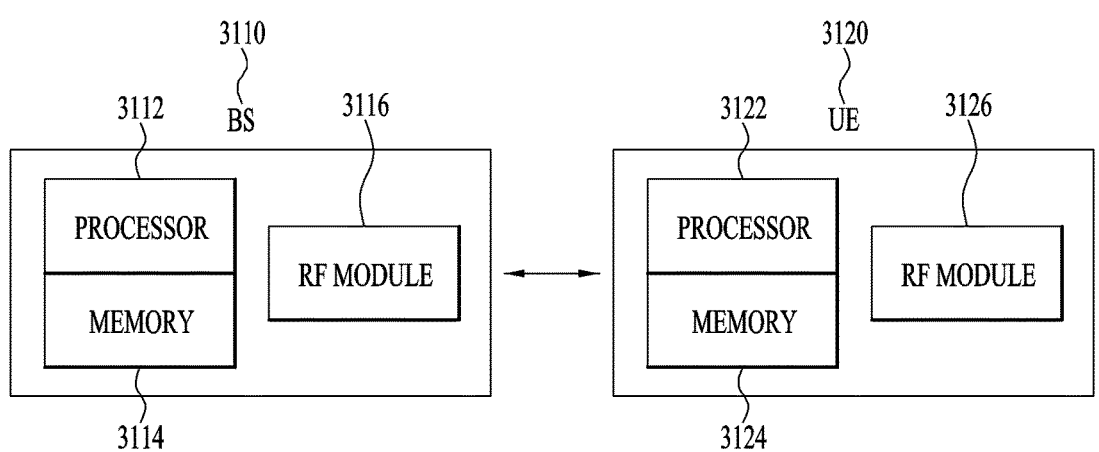
FIG. 31 is a block diagram showing the configuration of a communication apparatus according to one embodiment of the present invention.

FIG. 31 is a block diagram showing the configuration of a communication apparatus according to one embodiment of the present invention.

Referring to FIG. 31, the wireless communication system includes a base station (BS) 3120 and a UE 3220.

In downlink, a transmitter may be part of the BS 3110 and a receiver may be part of the UE 3120. In uplink, a transmitter may be part of the UE 3120 and a receiver may be part of the BS 3110. The BS 3110 includes a processor 3112, a memory 3114 and a radio frequency (RF) unit 3116. The processor 3112 may be configured so as to implement the procedures and/or methods proposed by the present invention. The memory 3114 is connected to the processor 3112 and stores a variety of information related to operations of the processor 3112. The RF unit 3116 is connected to the processor 3112 and transmits and/or receives RF signals. The UE 3120 includes a processor 3122, a memory 3124 and a radio frequency (RF) unit 3126. The processor 3122 may be configured so as to implement the procedures and/or methods proposed by the present invention. The memory 3124 is connected to the processor 3122 and stores a variety of information related to operations of the processor 3122. The RF unit 3126 is connected to the processor 3122 and transmits and/or receives RF signals. The BS 3110 and/or the UE 3120 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In this document, the embodiments of the present invention have been described centering on a data transmission and reception relationship between a UE and a BS. Such a transmission reception relationship be equally/similarly to signal transmission and reception between a UE and a relay or a BS and a relay. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc. The term terminal also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example of applying a method and apparatus for configuring resources in D2D communication to a 3GPP LTE system has been described, the present invention is applicable to various wireless communication systems in addition to the 3GPP LTE system.

The invention claimed is:

1. A method for transmitting a Device-to-Device (D2D) signal at a User Equipment (UE) in a wireless communication system, the method comprising:
   acquiring, by the UE, a timing of a downlink subframe in a cell; and
   transmitting a first D2D signal for discovery in a first D2D subframe,
   wherein the first D2D subframe is a subframe configured for a D2D link, and
   wherein a transmission timing of the first D2D subframe is determined by configuring a timing advance as 0 and applying the timing advance to the downlink subframe.

2. The method according to claim 1, wherein the UE is in Radio Resource Control (RRC) connection state or RRC Idle state.

3. The method according to claim 1, wherein the transmission timing of the first D2D subframe is determined as the timing of the downlink subframe.

4. The method according to claim 1, further comprising:
   transmitting a second D2D signal for communication in a second D2D subframe,
   wherein a transmission timing of the second D2D subframe is determined as a timing of an uplink subframe.

5. The method according to claim 1, further comprising:
   transmitting a second D2D signal for communication in a second D2D subframe,
   wherein a transmission timing of the second D2D subframe is determined by configuring the timing advance as 0 and applying the timing advance to the downlink subframe.

6. The method according to claim 1, wherein the transmission timing of the first D2D subframe is determined by applying a fixed value of a timing offset to the timing of the downlink subframe between the UE and the cell.

7. The method according to claim 6, wherein a type of the first D2D subframe is applicable to Time Division Duplex (TDD).

8. The method according to claim 1, wherein a type of the first D2D subframe is applicable to Frequency Division Duplex (FDD).

9. The method according to claim 8, wherein symbols included in the first D2D subframe are Single Carrier-Frequency Division Multiple Access (SC-FDMA) symbols.

10. The method according to claim 1, wherein a last symbol of a plurality of symbols in the first D2D subframe is a guard period.

11. The method according to claim 1, further comprising:
    receiving a timing advance command; and
    acquiring a timing advance used for determining a timing of an uplink subframe.

12. The method according to claim 11, wherein the transmission timing of the first D2D subframe is determined by ignoring the timing advance acquired by receiving the timing advance command.

13. A user equipment (UE) for transmitting a Device-to-Device (D2D) signal in a wireless communication system, the UE comprising:
    a transmitter;
    a receiver; and
    a processor operably coupled to the transmitter and the receiver, the processor configured to:
    acquire a timing of a downlink subframe in a cell, and
    control the transmitter to transmit a first D2D signal for discovery in a first D2D subframe,
    wherein the first D2D subframe is a subframe configured for a D2D link, and wherein a transmission timing of the first D2D subframe is determined by configuring a timing advance as 0 and applying the timing advance to the downlink subframe.

14. The UE according to claim 13, wherein the UE is in Radio Resource Control (RRC) connection state or RRC Idle state.

15. The UE according to claim 13, wherein the transmission timing of the first D2D subframe is determined as the timing of the downlink subframe.

16. The UE according to claim 13, wherein the processor is further configured to transmitter to transmit a second D2D signal for communication in a second D2D subframe,
wherein a transmission timing of the second D2D subframe is determined as a timing of an uplink subframe.

17. The UE according to claim 13, wherein the processor is further configured to transmitter to transmit a second D2D signal for communication in a second D2D subframe,
wherein a transmission timing of the second D2D subframe is determined by configuring the timing advance as 0 and applying the timing advance to the downlink subframe.

18. The UE according to claim 13, wherein the transmission timing of the first D2D subframe is determined by applying a fixed value of a timing offset to the timing of the downlink subframe between the UE and the cell.

19. The UE according to claim 18, wherein a type of the first D2D subframe is applicable to Time Division Duplex (TDD).

20. The UE according to claim 13, wherein a type of the first D2D subframe is applicable to Frequency Division Duplex (FDD).

* * * * *